(12) United States Patent
Schied et al.

(10) Patent No.: US 11,436,793 B1
(45) Date of Patent: Sep. 6, 2022

(54) SYSTEMS AND METHODS FOR GRAPHICS RENDERING BASED ON MACHINE LEARNING

(71) Applicant: Facebook Technologies, LLC, Menlo Park, CA (US)

(72) Inventors: Christoph Hermann Schied, Seattle, WA (US); Anton S. Kaplanyan, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 17/175,517

(22) Filed: Feb. 12, 2021

(51) Int. Cl.
| | |
|---|---|
| G06T 15/50 | (2011.01) |
| G06T 7/90 | (2017.01) |
| G06T 15/20 | (2011.01) |
| G06N 3/08 | (2006.01) |
| G06T 15/80 | (2011.01) |

(52) U.S. Cl.
CPC ............ *G06T 15/506* (2013.01); *G06N 3/08* (2013.01); *G06T 7/90* (2017.01); *G06T 15/20* (2013.01); *G06T 15/80* (2013.01); *G06T 2207/10024* (2013.01); *G06T 2207/20081* (2013.01)

(58) Field of Classification Search
None
See application file for complete search history.

(56) References Cited

U.S. PATENT DOCUMENTS

| | | |
|---|---|---|
| 7,633,506 B1 | 12/2009 | Leather |
| 2003/0107573 A1 | 6/2003 | Miller |
| 2004/0017366 A1 | 1/2004 | Narita |
| 2005/0190194 A1 | 9/2005 | Kraemer |
| 2011/0193978 A1 | 8/2011 | Wu |
| 2011/0199391 A1 | 8/2011 | Olsson |
| 2011/0316855 A1 | 12/2011 | Mejdrich |
| 2012/0330620 A1 | 12/2012 | Sullivan |
| 2013/0044128 A1 | 2/2013 | Liu |
| 2013/0335434 A1 | 12/2013 | Wang |
| 2015/0193967 A1 | 7/2015 | Wang |
| 2018/0109526 A1 | 4/2018 | Fung |
| 2018/0349527 A1 | 12/2018 | Li |
| 2018/0357514 A1 | 12/2018 | Zisimopoulos |
| 2019/0183451 A1 | 6/2019 | Yu |

(Continued)

OTHER PUBLICATIONS

Sun, Tiancheng, et al. "Single image portrait relighting." ACM Transactions on Graphics (TOG) 38.4 (2019): 1-12. (Year: 2019).*

(Continued)

*Primary Examiner* — Ryan McCulley

(74) *Attorney, Agent, or Firm* — Baker Botts L.L.P.

(57) ABSTRACT

Embodiments described herein pertain to a machine-learning approach for shading. A system may determine a number of pixels associated with a viewpoint of a viewer. The system may determine, for each of the pixels, (1) a view direction based on the viewpoint and a pixel position of that pixel and (2) and a surface orientation of a surface visible to that pixel. The system may generate, using a first machine-learning model, a latent space representation of ambient lighting information associated with the pixels based on respective view directions and surface orientations. The system may determine color values for the pixels by processing the latent space representation of ambient lighting information using a second machine-learning model.

20 Claims, 12 Drawing Sheets

(56) References Cited

U.S. PATENT DOCUMENTS

| | | |
|---|---|---|
| 2019/0228723 A1 | 7/2019 | Mei |
| 2020/0008701 A1 | 1/2020 | Ye |
| 2020/0090371 A1 | 3/2020 | Hu |
| 2020/0160594 A1 | 5/2020 | Hoover |
| 2020/0167654 A1 | 5/2020 | Guo |
| 2022/0101597 A1* | 3/2022 | Panneer .................. G06T 15/10 |

OTHER PUBLICATIONS

Sengupta, Soumyadip, et al. "Sfsnet: Learning shape, reflectance and illuminance of facesin the wild." Proceedings of the IEEE conference on computer vision and pattern recognition. 2018. (Year: 2018).*

International Search Report and Written Opinion for International Application No. PCT/US2020/018130, dated Jun. 25, 2020.

Esser, et al., Convolutional Networks for Fast, Energy-Efficient Neuromorphic Computing, arxiv.org, XP055346052, 8 pages, May 24, 2016.

Kyrkou, Stream Processors and GPUs: Architectures for High Performance Computing the Department of Electrical and Computer Engineering, Student Member, IEEE University of Cyprus, Nicosia, Cyprus, 2014.

Nalbach, et al., Deep Shading: Convolutional Neural Networks for Screen-Space Shading, arXiv:1603.06078v2 [cs.GR], 12 pages, Aug. 3, 2016.

Akenine-Moller, et al., Real-Time Rendering, Chapter 2: The Graphics Rendering Pipeline, XP55704180, 20 pages, 2008.

Davies, et al., Feature Article: Neuromorphic Computing, Loihi: A Neuromorphic Manycore Processor with On-Chip Learning, IEEE Computer Society, XP55704102, 18 pages, Feb. 2018.

Nguyen-Phuoc, et al., RenderNet: A deep convolutional network for differentiable rendering from 3D shapes, arxiv.org, 18 pages.

* cited by examiner

SYSTEMS AND METHODS FOR GRAPHICS RENDERING BASED ON MACHINE LEARNING

TECHNICAL FIELD

This disclosure generally relates to a machine-learning approach for generating computer graphics.

BACKGROUND

"Computer graphics" refers to computer-generated image data (including still images and videos) created using graphics hardware and software. Computer graphics, especially ones with high-resolution and/or high-frame-rate, are computationally costly to generate. For example, to generate a single image with 4096×2160 resolution means that the colors of nearly 9 million pixels need to be determined. To generate a video with 60 frames-per-second (fps), the number of pixels needed every second quickly approaches 530 million. The amount of computational power needed to render such a vast amount of color data within stringent timeframes often becomes the bottleneck for computer graphics applications. For example, to meet the timing demands of real-time rendering, computer graphics applications often need to sacrifice resolution and/or the complexity of the scene, resulting in less than ideal results.

Specialized hardware has been developed to address the high computational demands of computer graphics. Graphics processing units ("GPU") are specialized computing hardware optimized for graphics progressing. Compared to general-purpose central processing units ("CPU"), GPUs have many more execution units and transistors that are designed to perform highly parallel operations. In addition, GPUs include specifically designed hardware components for performing particular operations that are common in graphics-rendering pipelines. For example, a GPU may have hardware components for performing, in general, geometry processing, rasterization, and shading. Certain stages in the pipeline are designed to use physically-based rendering techniques, which are computationally expensive and do not scale well. As such, the computational expense could become prohibitive if the desired image is of a complex scene and/or the desired image resolution is high. Thus, although current GPU designs have provided tremendous processing power for rendering graphics, their performance continues to be a bottleneck for graphics applications.

SUMMARY OF PARTICULAR EMBODIMENTS

Particular embodiments described herein relate to a method of using a machine-learning (ML) model (e.g., a ML-based lighting information encoder) trained based on the ambient light data of the environment to reduce the amount of computation for rendering objects illuminated by the ambient light of the environment. For ML training purpose, the system may first generate an environmental map to capture the ambient lighting information of a particular environment (e.g., an open space with sun light). The environmental map may include a number of images captured in the environment from different directions. For example, these images may form an image cube to represent the ambient lighting information of all directions in the 3D space of the environment. Alternatively, the environmental map may include a panorama picture of the environment capturing the lighting information from all directions. The system may generate random pixel samples for training purpose. For example, the random pixel samples may include pixels of visible portions of hypothetical objects (e.g., randomly generated objects, surfaces, or pixel sets). Each pixel may be associated with a view direction (e.g., a vector pointing from the camera corresponding to the point of view to the pixel of interest) and a surface orientation (e.g., a normal direction at the location of the pixel of interest).

During the training process, the system may feed the pixel samples (with corresponding view directions and surface orientations) and the environmental map to the ML model for training purpose. The ML model may generate a latent space representation representing the ambient lighting information in the environment. The latent space representation may include ambient lighting information corresponding to the view directions and surface orientations as set by the training pixel samples. Then, the system may feed the latent space representation to a shading network, which may be another ML model taking in material properties for each pixel of the visible portion of the hypothetical objects and determining the color values for the corresponding training pixel samples. The color values determined by the shading network may be compared to ground truth results (e.g., which is determined by traditional ray-casting method or determined by measurement of a real object placed in the environment). The different between the color values determined by the shading network and the ground truth may be processed by a loss function and may be fed back to the ML model (e.g. corresponding to the ambient light encoder) to allow the ML model to adjust it parameters to minimize the difference. The ML model may be trained with sufficient training pixel samples to allow the difference between the resulting color values and the ground truth to be within a pre-determined threshold range. As a result, the ML model after being trained may capture the ambient lighting information of the environment as represented by the environmental map and may be used to render objects illuminated by the ambient light of the environment.

At inference time, the system may first determine the visible portion(s) of the object of interest to be rendered. Then, the system may determine, for each pixel in the visible portion(s), a view direction (e.g., a camera direction) and a surface orientation (e.g., a normal). After that, the system may feed these view directions and surface orientations to the ML model that has been trained by the ambient light data. The ML model may generate a latent space representation for the ambient light of the environment and feed the latent space representation to the shading network to determine the image of the visible portion(s) of the object interest. Because the ambient light of all directions are represented by the latent space representation generated by the ML model (rather than calculated separately on each direction), the computation amount that is needed to render the objects can be greatly reduced.

It is notable that the ML model corresponding to the ambient light encoder is for encoding the ambient light of the environment (e.g., sun light, moon light, lamps at a far distance). To simplify the problem, the system may assume that the ambient light source is infinitely far from the object of interest. As a result, the training result by a particular surface orientation as set by a training pixel sample at a particular location in the environment may be applicable to all other locations in the environment. Furthermore, the actual position of the object of interest in the surrounding environment may not affect the lamination result of the object by the ambient light (but the camera direction does affect the result image because of directional light reflections). Other light sources that are relatively closer to the object of interest may be processed separately by separate light encoders which may stochastically sample the lighting information using the method as described in Vienna 2.0. The system may determine an overall light latent space representation combining the latent space representations of the ambient light and other light sources (that are relatively close to the object). The system may use the shading network to generate the resulting images of the object of interest. As a result, the rendered object of interest may appear to be illuminated by both the ambient light of the environment and other light sources in the environment.

Embodiments of the invention may include or be implemented in conjunction with any type of computing system, including but not limited to mobile devices, desktops, servers, graphics systems, and artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a graphics processing chip, a method, a storage medium, a system, and a computer program product, wherein any feature mentioned in one claim category, e.g., graphics processing chip, can be claimed in another claim category, e.g., system, storage medium, computer program product, and method, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
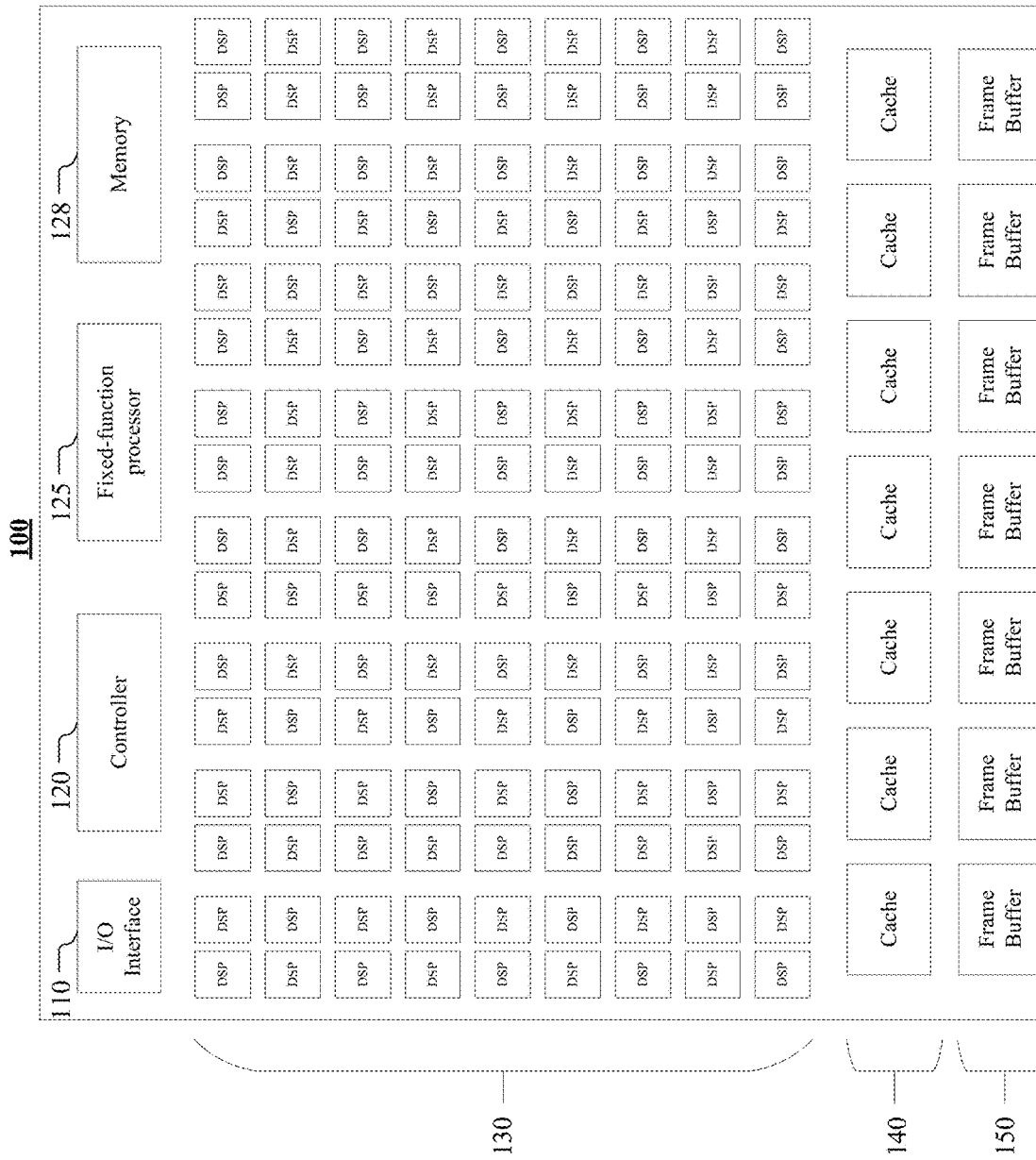
FIG. 1 illustrates an example of an ML graphics processing chip in accordance with particular embodiments.

Particular embodiments described herein relate to a graphics processing chip designed to support one or more phases in a graphics-rendering pipeline to be machine-learning based. For example, the graphics processing chip may include an array of programmable digital signal processors (DSPs) configured to performing shading operations in accordance with a machine-learning model trained to perform such tasks. For example, the machine-learning model may be trained to take as input attributes (such as positions, normal, reflectance, lighting, etc.) associated with a fragment of an object that is too visible to a camera or viewer and output pixel color values to display the fragment. The operations performed by such a machine-learning-based approach are much faster than those performed by traditional GPUs with streaming processors or fixed-function modules designed for performing computationally expensive physically-based shading. In addition, the graphics processing chips described herein allow graphics rendering to be much more scalable than traditional GPUs, which in turn allow computer-graphics applications with stringent time constraints (e.g., real-time rendering) to design much more complex and/or detailed scenes.

The complexity of rendering a virtual scene depends in large part on the number of light sources in the scene, since each light source could contribute to how objects appear. For example, if a red light source and blue light source are both present in a scene, a white fragment might appear purple due to the red and blue lights. Thus, when determining the color for a particular fragment, the rendering system would need to account for each light source whose radiance would reflect off of that fragment and into the viewpoint of the user or imaginary camera. For example, if there are n light sources in the environment, the rendering system would need to perform shading operations (determining the color of pixels) for each of the n light sources and aggregate the results. In other words, n shading operations may need to be performed. Doing so would be computationally expensive and consume a lot of power, as shading operations are typically responsible for the vast majority of the power consumed during graphics rendering.

One way to reduce computation and power is by leveraging machine learning (or deep learning) techniques to perform shading. In particular embodiments, shading operations may be performed in two separable passes, thereby amortizing costs. The first pass encodes lighting information within the environment, and the second pass performs shading using the encoded lighting information. Lighting information contributed by each light source may be encoded as a latent representation. To do so, a computing system may first compute, for each pixel, the visibility of objects in the virtual environment. The visible fragments of those objects may have incident light originating from any number of light sources. To account for a particular light source 1, the system may determine the lighting information, such as light direction and intensity, associated with the light source 1 relative to each visible fragment, which may be stored as a matrix of lighting information that corresponds to the pixels of an output image. Similarly, the system may generate a collection of lighting information associated with another light source 2. Each collection of lighting information may be encoded as a latent representation using a machine-learning model (e.g., an encoder). In particular embodiments, the latent representation of the lighting information of individual light sources may be additive, meaning that the contribution of individual light sources could be accumulated by adding the latent representations. The aggregation of all latent representations would result in a single aggregated latent representation that represents the complete lighting information in the environment. In particular embodiments, the aggregated latent representation may then be processed by another machine-learning model trained to perform shading. The shading model may process the aggregated latent representation along with material properties of the visible fragments and the viewer's viewing direction to compute the pixel colors. Unlike the shading method described above, this process only performs a single shading operation for any number of light sources. This is achieved by separately encoding the lighting information of the n light sources into a latent space, aggregating the latent representations, and then performing one shading pass on the resulting aggregated latent representation. Since only a single shading operation is performed, this method can drastically improve shading costs.

Particular embodiments described herein further reduces the complexity of the machine-learning-based shading method described above by making it agnostic to the number of light sources in the environment. In the method described above, each light source is to be independently processed to generate a corresponding latent representation. As such, as the number of light sources in the environment increases, so does the cost of shading. To improve scalability, particular embodiments described herein encode a single latent representation that encodes stochastically sampled lighting information of all relevant light sources in the environment. For example, a computing system may stochastically select one light source per pixel and encode the lighting information contributed by that light source for that pixel. The latent representation of the pixel array, therefore, encodes the lighting information of different light sources for different pixels. However, the resulting latent representation is noisy because the latent vector associated with each pixel is incomplete. For example, even if the light incident on a particular fragment is contributed by multiple light sources, the latent encoding of the lighting information for the corresponding pixel may only take into consideration the contribution from one of the light sources.

To address the noise in the latent representation, particular embodiments may train a machine-learning model for denoising such latent representations (also referred to as a denoiser or denoiser network). Conceptually, the denoiser network may be trained to use latent information from neighboring pixels to compute the contribution of all lights sources in the environment. The denoiser network may output a denoised latent representation of the lighting information in the environment. The denoised latent representation, along with material properties of object fragments to be displayed by the pixels, may then be processed by a shading machine-learning model to compute the pixel colors. In such embodiments, the denoising process happens before material properties are used. Since the high-frequency details contained in the material properties would not undergo denoising, such details are preserved. Another benefit of not having the denoising process consider material properties is that the denoiser could be kept simpler.

GPUs are specialized processors for rendering 3D graphics. Traditional GPUs are designed to perform a series of operations in accordance with a graphics-rendering pipeline to synthesize an image from a description of a scene. Conceptually, the graphics-rendering pipeline takes as input a 3D model, which is usually defined by a wire mesh of triangles or other types of geometry. An example of a graphics-rendering pipeline may include, at a high-level, geometry-processing, rasterization, shading, and post-processing. During the geometry-processing phase, 3D model definitions (e.g., defined using 3D coordinates of vertices and edges) of computer-graphics objects (e.g., a teapot, table, etc.) may be transformed from a model coordinate system into a common coordinate system. The output of the 3D model transformation may be a stream of vertices. The lighting properties of each vertex may then be computed based on the lighting conditions and the camera position. Then, the vertices may be assembled into colored triangles. The output of this phase may be a stream of triangles. Triangles that are not visible may be discarded (or clipped) based on z-buffer testing.

After the geometry-processing phase of the graphics-rendering pipeline, the resulting triangles may be rasterized. Rasterization is the process of transforming each of the triangles into a raster format represented by one or more fragments (e.g., visually the fragments may be squares that collectively approximate the triangle). The fragments may represent candidate pixel values (each pixel could correspond to multiple fragments). The output of the rasterization phase is a stream of fragments.

The next phase in the graphics-rendering pipeline may be shading, which refers to the process of determining the appropriate color of each fragment that is visible. Traditional GPUs are designed to perform physically-based shading. For example, to compute the appropriate color value for each fragment, the shading process may be configured to use a shading algorithm (e.g., Gouraud or Phong shading) and/or illumination model that accounts for the physical behaviors and properties of light. Conceptually, for example, a physically-based shader may account for how a ray may reflect, refract, and/or diffract into subrays by computing how the ray would behave, according to physics, with the virtual 3D surface based on its position and orientation, material properties, and/or texture. This process is computationally expensive and does not scale well with scene complexity (e.g., more computation is needed to account for more light sources and/or objects in the scene). As a result, the existing shading process of GPUs imposes a practical bottleneck for graphics applications.

After pixel colors have been determined by the shading phase, any desired post-processing may be performed to create the desired effects, including, but not limited to, blending, blurring, anti-aliasing, etc. As an example, when blurring is desired, the rendering system may take the bit-accurate image result from the shading process and then average nearby pixels to generate a blurred image. Thus, to generate a blurred image, the system would (1) first generate a bit-accurate image and (2) blur the result. Not directly generating the desired output (in this case, a blurred image) may introduce inefficiency.

Traditional GPUs are equipped with specially designed hardware that is optimized for performing the various operations of the graphics-rendering pipeline. For example, certain GPUs may have fixed-function processing units that are each dedicated to accelerating geometry processing, rasterization, or shading. Additionally or alternatively, GPUs may have an array of stream processors, designed to provide fast and efficient parallel execution of floating-point computations, that can be selectively tasked with performing different stages of the pipeline. For example, a GPU's physical layout may be predominantly occupied by stream processors, which can be selectively tasked with performing operations such as vertex processing, geometry processing, and pixel/fragment processing. The speed and efficiency, however, come at the expense of flexibility. For example, while stream processors are suitable for applications requiring high levels of parallelism and data locality, they are not as efficient for performing logical or branching-intensive operations.

Even though the stream processors and fixed-function hardware are highly optimized to perform shading operations, such operations are nevertheless computationally expensive (e.g., physically-based simulations) and limits real-time performance. To address the various limitations of traditional GPUs and the need for faster, more power-efficient ways to render graphics, particular embodiments described herein introduce a new machine-learning (ML) graphics processing chip with machine-learning acceleration hardware configured to support a graphics-rendering pipeline with stages that are machine-learning based. In particular embodiments, the machine-learning pipeline implemented by the graphics processing chip may use machine-learning techniques to perform shading, rather than physically-based shading. It is observed that on a GPU, the different stages of a graphics-rendering pipeline typically have different power consumption characteristics. As mentioned above, the shading processing stage is typically the bottleneck. For instance, to render a typical image, roughly 10% of the power and time used may be for geometry processing, 50% may be for shading, and 40% may be for local shading and post-processing. If no post-processing operation is performed, the total percentage of power and time spent for shading would further dwarf the power and time used for geometry processing (e.g., shading be responsible for 80% of power consumption). Thus, by using machine-learning techniques to perform shading operations rather than relying on physically-based computations, the ML graphics processing chip can render images with significantly less power and time. An additional benefit of using an ML-based shader is that it affords the designer the flexibility to sacrifice rendering quality to meet stringent runtime demands. For example, for applications that require high frame rate but not bit-accurate results, the ML graphics processing chip may use a smaller neural network to output faster results. Even though the rendering quality may not be bit-accurate, it may be still sufficiently good for that particular application as the sub-optimal quality may not be perceptible (e.g., the scene may be fast-moving, or the pixels may be in the peripheral vision of the user anyway). This option is not available on traditional GPUs since shaders are configured to only output bit-accurate results.

FIG. 1 illustrates an example of an ML graphics processing chip 100 in accordance with particular embodiments. The ML graphics processing chip 100 may have an input/output interface 110 for communicating with an off-chip circuit (e.g., a central processing unit or memory modules), through which rendering instructions and data are received. There may also be a controller 120 for performing scheduling logic, assigning computational resources, thread management, etc. The ML graphics processing chip 100 may also have fixed-function processors 125 that for performing highly-parallel tasks such as rasterization, data assembly, z-culling, etc. The chip 100 may also have one or more memory banks 128 for storing programmable instructions, including machine-learning models that are trained to perform shading operations. In addition, the ML graphics processing chip 100 may have cache 140 (e.g., L1 or L2 cache) and frame buffers 150 to which the output image is written for display.

In particular embodiments, the ML graphics processing chip 100 may have a large array of digital signal processors (DSP) 130 that are configured to accelerate ML operations. Unlike stream processors used by GPUs, DSPs are more flexible processors that can accommodate the varying designs of machine-learning models and data configurations. For example, the DSPs 130 may be configured to accelerate vector and/or matrix operations, which are common operations for deep neural networks and convolutional layers. DSPs 130 are also more suitable for handling memory-intensive operations, which may be required by certain machine-learning models (e.g., recurrent neural networks). Thus, the DSPs 130 improve the ML graphics processing chip's 100 efficiency and ability to perform the needed machine-learning operations on-chip and help eliminate or minimize the need for splitting operational duties with the CPU, which can introduce latency and inefficiency.

In particular embodiments, ML graphics processing chip 100 may be configured to perform the full shading stage of the graphics-rendering pipeline using a machine-learning model. A machine-learning-based approach has several advantages over the physically-based approach to shading. As described above, the traditional physically-based shading pipeline is computationally expensive as it needs to perform complex computations to mimic the physical properties of light. As a result, physically-based shading scales poorly with the complexity of a scene (e.g., a scene that has many objects and/or light sources may make the scene overly complex to render within the allotted time). In contrast, a machine-learning-based shading pipeline uses machine learning to learn how certain inputs (e.g., lighting, material properties, ray incidents, etc.) correlate to color without needing to compute light traversal and other computationally expensive calculations that would otherwise be needed in the physically-based pipeline. In addition, unlike traditional pipelines where post-processing effects are applied after a full-frame is rendered (e.g., after a clean, sharp image is rendered, it is altered in a subsequent post-processing step to correct for aliasing artifacts), the machine-learning-based shading process may directly render a frame with the desired post-processing effect (e.g., anti-aliasing, depth-of-field, blurring, etc.). The machine-learning-based shading process also affords further optimization by allowing the color of multiple pixels to be determined in one pass. In particular embodiments, each pass through the machine-learning model may output the color value for a single pixel. However, in other embodiments, the machine-learning model may be configured to process the color values of multiple pixels in one pass of the machine-learning model (e.g., the output of one pass may be the color values for a 2-by-2, 3-by-3, or n-by-m block of pixels, which may also be referred to as a tile). In addition, the machine-learning-based shading process is much more scalable to scene complexity, which in turn allows designers of graphics applications to be less hindered by the practicalities of graphics rendering. These examples of the computational efficiency afforded by the embodiments described herein translate to reduced power consumption (which is especially important for mobile devices with limited power source and weight and size limitations) and rendering time.

Figure 2:
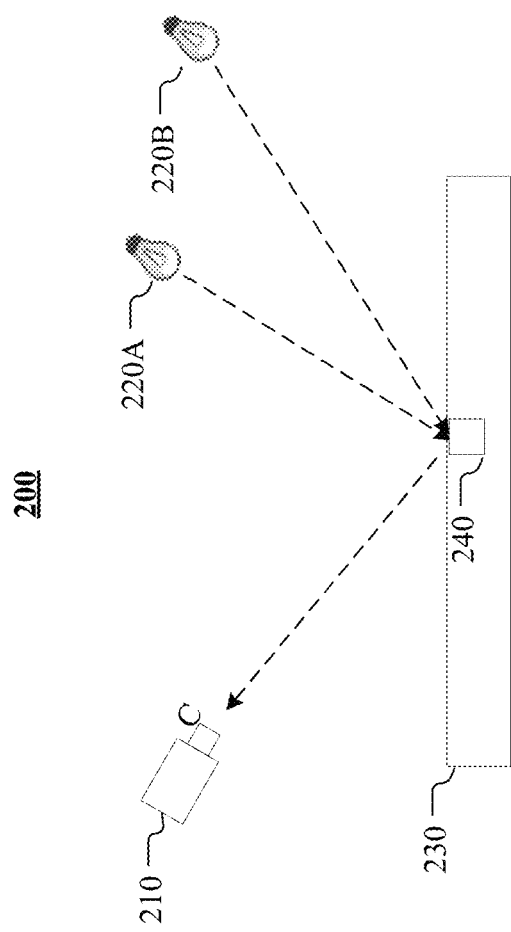
FIG. 2 illustrates an example method for determining the aggregate lighting information contributed by light sources in a virtual environment.

As previously described, lighting information contributed by light sources within an environment may be encoded in a latent space and processed by an ML-based shading model to generate pixel colors. In particular embodiments, the contribution of individual light sources may be separately encoded and aggregated before being processed by the shading model. FIG. 2 illustrates an example method for determining the aggregate lighting information contributed by light sources in a virtual environment 200. When rendering a scene of the environment 200, a rendering system may first determine the desired perspective from which the scene is to be rendered. The perspective may be represented by a pose (e.g., pose and orientation) of a camera 210 or viewer in the virtual environment 200. The rendering system may then determine the visibility of objects in the environment 200 to the camera 210. In particular embodiments, the rendering system may perform a visibility test by casting imaginary rays into the environment 200 from the camera 210 through each pixel of an imaginary image or screen. In this manner, the system would determine a corresponding object or portion thereof that is visible for each pixel. For example, the system may determine that a portion 240 of the object 230 defined in the environment 200 is visible to a particular pixel as viewed from the perspective of the camera 210. To determine the color of the pixel associated with the visible portion 240 of the object 230, the rendering system would need to take into consideration the lighting in the environment 200. In the example shown in FIG. 2, the environment 200 has two light sources, light source 220A and light source 220B. Both light sources 220A, 220B emit light that would be reflected and/or refracted by the portion 240 of the object 230 and captured by the camera 210. As such, the color of the pixel would be influenced by both light sources 220A, 200B.

In particular embodiments, contributions of the light sources in the environment may be deterministically computed for each pixel. As an example, for the pixel associated with the portion 240 of the object 230 in FIG. 2, the rendering system would compute the lighting information associated with both light sources 220A, 220B. Thus, if the image being rendered has m pixels and the virtual environment has n light sources, the rendering system would need to make m×n computations to account for the contributions of the n light sources in the environment.

Figure 3:
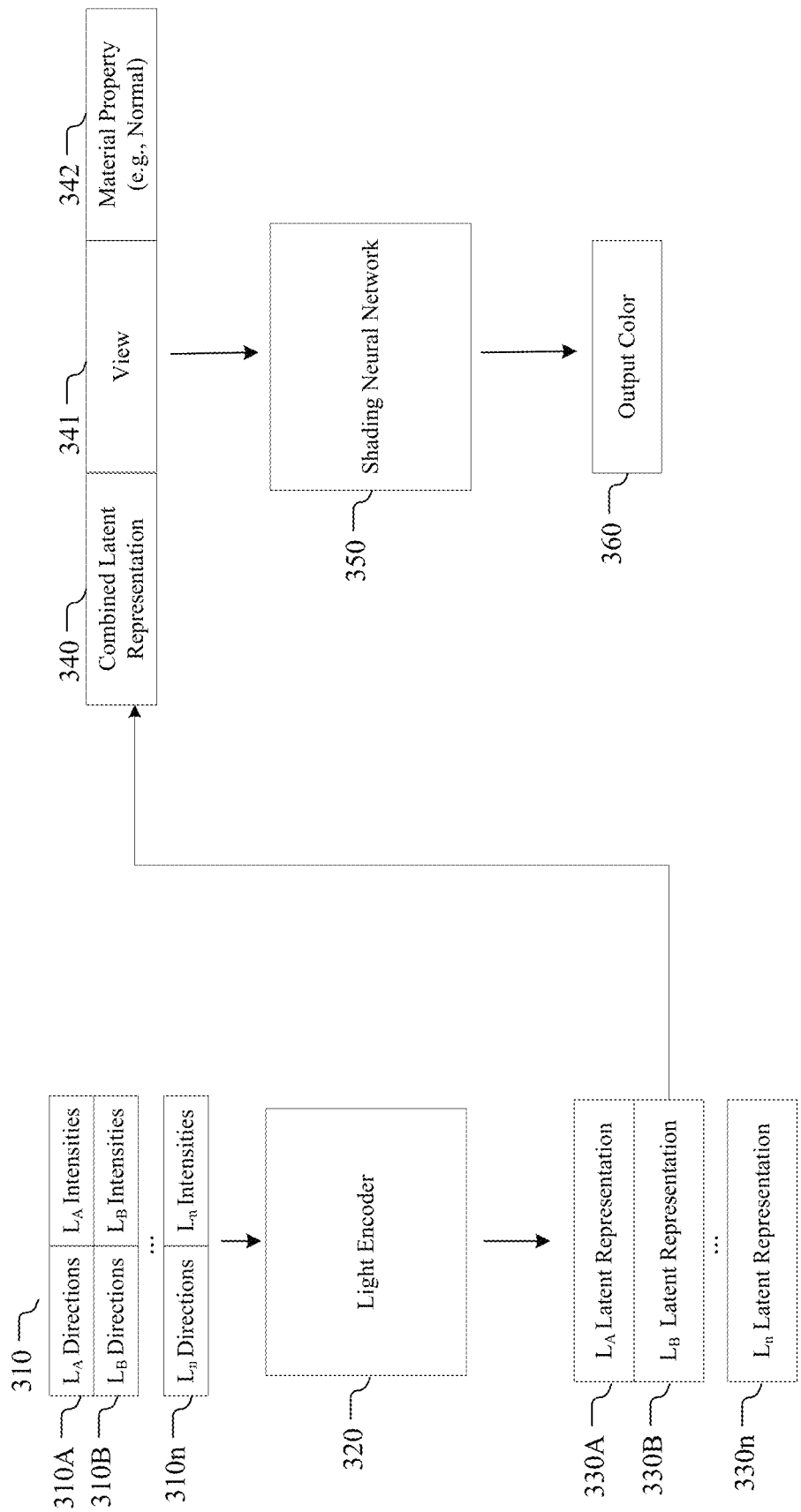
FIG. 3 illustrates an embodiment of a machine-learning shading architecture configured to process deterministically computed lighting information for each pixel.

FIG. 3 illustrates an embodiment of a machine-learning shading architecture 300 configured to process deterministically computed lighting information for each pixel. Lighting information 310 used for rendering may be computed per light source for each pixel of an image. Thus, for an environment with n light sources, the rendering system may generate n corresponding lighting information arrays that each includes the contribution of one of the light sources. For example, the rendering system may generate a lighting information array 310A for light source A, another array 310B for light source B, another array 310n for light source n, and so on. Each lighting information array may include lighting information of the associated light source for one or more pixels of the image being rendered. As an example, the lighting information array 310A may include lighting information of light source A for one of the pixels. As previously described with reference to FIG. 2, each pixel $p_i$ may be associated with a visible portion of an object $o_i$. The lighting information array 310A may include, for pixel $p_i$, information pertaining to light source A relative to the visible portion of the object $o_i$. For example, the lighting information associated with pixel $p_i$ may include a directional vector that indicates the relative position between light source A and the visible portion of the object $o_i$ (e.g., a direction vector that points from a point representing of $o_i$ in 3D space towards light source A). The lighting information associated with pixel $p_i$ may further include the light intensity of light source A relative to $o_i$. In an embodiment where multiple pixels are simultaneously processed by the light encoder 320, the lighting information array 310A may further include, for pixel $p_j$, the direction and intensity of light source A relative to the associated visible object portion $o_j$. Light source arrays B 310B and n 310n would similarly include the contributions of light source B and n, respectively, relative to one or more of the pixels of the image being rendered.

In particular embodiments, each lighting information array 310A to 310n may be processed by a light encoder 320 (e.g., a machine-learning model, such as a neural network) to generate corresponding latent representations 330A to 330n in a common latent space. The latent encoder 320 may be trained to encode each lighting information array (e.g., 310A) as a latent representation (e.g., 330A). In particular embodiments, the light encoder 320 may be trained using an encoder-decoder model. The model may include an encoder and a decoder. The encoder may be configured to process lighting information arrays and encode the data in latent space. The decoder may be configured to process the encoded data in latent space and output the lighting information. The output of the decoder may be compared to the original lighting information using one or more loss functions, and the two networks may be updated based on the comparisons. Training may terminate after a sufficiently large number of training samples have been processed or when the loss function indicates that the output of the decoder is sufficiently similar to the original lighting information. Once training terminates, the encoder may be used without the decoder to encode lighting information in latent space.

Each latent representation may include a latent vector for each of the one or more pixels. For example, the lighting information in array 310A associated with a pixel $p_i$ may be encoded as latent vector vi. Thus, the latent representation 330A for light source A may have a single latent vector vi if the light encoder 320 is processing one pixel at a time. However, in other embodiments where the light encoder 320 is configured to process multiple pixels at a time, the latent representation 330A may have multiple latent vectors, such as latent vectors 1 to m for the m pixels in the image. Similarly, the latent representation 330n for light source n may have latent vectors 1 to m for the m pixels in the image. Each latent vector may include a series of numeric values that together encode the lighting information of a particular light source associated with a particular pixel.

In particular embodiments, the latent representations of the various light sources may be combined to generate a combined latent representation 340. As previously mentioned, the latent representations 330A-n may all be encoded in the same latent space. These latent representations 330A-n may be combined by aggregating the corresponding latent vectors. For example, the latent vectors in latent representations 330A-n associated with pixel $p_i$ may be summed to generate a combined latent vector for pixel $p_i$ in the combined latent representation 340.

The machine-learning architecture 300 may include a neural network 350 (or other suitable machine-learning models) configured to perform the task of shading. The shading neural network 350 may be configured to process environmental data, including the combined latent representation 340, view directions 341, and material properties 342 of visible objects, to generate pixel colors 360. As previously discussed, each pixel may be associated with a portion of an object that is visible to the pixel (in other words, the visible portion is to be displayed by the pixel). Parameters associated with the visible portions of objects may be used as the input for the shading neural network 350. For example, the network 350 may be provided with the combined latent representation 340, which encodes lighting information associated with each visible portion. Viewing direction 341 of the camera/viewer relative to each visible portion may also be provided to the shading neural network 350 (e.g., the viewing direction may be represented by a direction vector pointing towards the camera/viewer from the visible portion of an object $o_i$). Material properties 342 of the visible portions of objects may further be provided to the shading neural network 350. For example, for each pixel $p_i$, the material properties of the visible portion of an object may be provided. The material properties associated with the visible portion may also include light-reflectance properties, which influence the color that would be observed. Other examples of material properties may include measures for metallic properties, roughness, specular reflectance, clearcoat, clearcoat roughness, refractive index, normal vector, and any other suitable measures of material property. The material properties may be physically-based (e.g., defined so that the material properties correspond to the actual physical material properties of an object, such as wood or glass) or defined in any desired manner (e.g., the material properties of a virtual object could have any desired material properties unconstrained by reality or physics).

In particular embodiments, based on the per-pixel encoded lighting information (represented by the combined latent representation 340), view direction 341, and material properties 342, the shading neural network 350 may learn to directly output the color 360, expressed in RGB (red, green, and blue) and alpha (transparency), of the pixel (or pixels, if the shading neural network 350 is configured to process multiple pixels simultaneously). The training data for training the network 350 may include a sufficiently large number of training samples that each includes the environmental parameters associated with each pixel (e.g., latent representation of lighting information, view direction, material properties, etc.) and the corresponding known target color values of an image (i.e., the ground truth). For example, if photo-realistic results are desired, then the ground-truth would be the color values of a photo-realistic image. Although in this example the ground-truth color is of a photo-realistic image, the ground-truth color is not so limited and could be any desired color. For example, the ground-truth could be a computer-generated or rendered image, an image to which a particular effect has been applied (e.g., a blurring or smoothing effect), an image that has undergone certain image corrections (e.g., white-balancing, color correction, anti-aliasing, etc.), or any other desired target image. Each time the network 350 outputs an inferred color result for a pixel, it may compare the result to the target color for that pixel using a loss function and use back-propagation to update the neural network 350 accordingly. After a sufficiently large number of such training iterations (e.g., after the loss function is below a threshold error rate or after a threshold number of training iterations), training may terminate. Once the shading neural network 350 is trained, it may, along with the light encoder 320, be executed by the one or more programmable DSPs 130 of the ML graphics processing chip 100 to perform shading operations.

Although the shading neural network 350 may learn to directly output pixel colors expressed in RGB (red, green, and blue) and alpha (transparency), for certain machine-learning models it may be difficult to learn multiplicative operations that would be needed to output color directly. Thus, in other embodiments, a shading neural network may instead learn to determine color weights and intensity that may be used to compute color. Instead of directly outputting color data, the shading network may be configured to output color weights and intensities (e.g., weight and intensity values may be generated for each of the RGB color components). The color weights and intensities output by the network may then be combined, using a color computation module, with the surface material properties associated with the visible portions of objects (e.g., by applying or multiplying each color component of the visible portion of an object with the corresponding inferred weight and/or intensity for that color component). The color computation module may then output the final RGB color.

As previously discussed, one drawback of the shading architecture shown in FIG. 3 is that per-pixel lighting information for each light source needs to be computed and encoded. Thus, if the virtual environment includes n light sources, the rendering system would need to deterministically compute n lighting information for each pixel and generate n latent representations. To improve scalability, particular embodiments may instead compute, for each pixel, lighting information associated with a subset of the light sources in the environment. For example, for each pixel, the rendering system may only compute the lighting information associated with a single stochastically selected light source. The end result may be a single lighting information array.

Figures 4A, 4B:
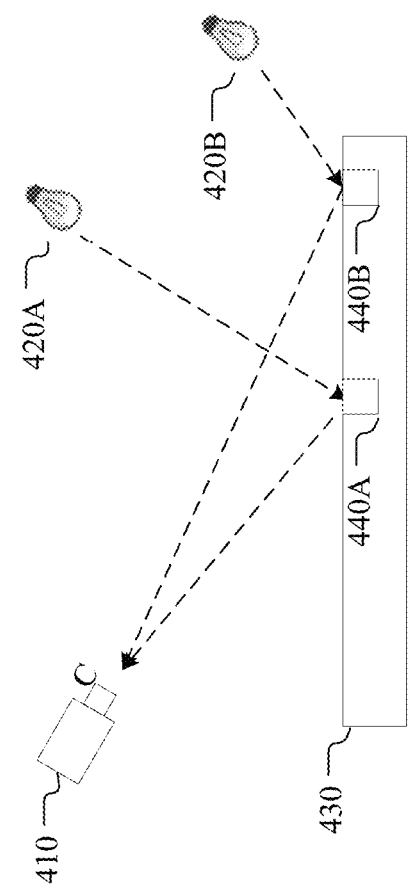
FIG. 4A illustrates an example method for stochastically determining the lighting information of multiple light sources in a virtual environment.
FIG. 4B illustrates an example representation of a stochastically determined lighting information array.

FIG. 4A illustrates an example method for stochastically determining the lighting information of multiple light sources in a virtual environment 400. The environment 400 may have two light sources 420A and 420B and an object 430. To render a scene of the environment 400 from a particular viewpoint 410 (represented by a virtual camera), the rendering system may first determine what objects or portions thereof are visible. In particular embodiments, this visibility test may be performed by casting imaginary rays from the viewpoint 410 into the environment 400 through the pixels of a virtual screen. Through the visibility test, the rendering system may determine which objects are visible to which pixels. For example, the rendering system may determine that one portion 440A of the object 430 is visible to a particular pixel A and another portion 440B of the object 430 is visible to pixel B.

Based on the visibility information, the rendering system may then compute the corresponding lighting information. Unlike the deterministic method described with reference to FIG. 2, where the contribution of all light sources is computed for each pixel, only the contribution of a select subset of the light sources (e.g., a single light source) for each pixel is computed for that pixel. In particular embodiments, the subset of light sources selected for each pixel may be chosen stochastically. As an example, in FIG. 4A, the rendering system may stochastically select light source 420A for the pixel A and slight source 420B for pixel B. Thus, the lighting information for pixel A may consider only the contribution of light source 420A. For example, the lighting information for pixel A may include the direction and intensity of light source 420A relative to the visible portion 440A of the object 430, similar to what was described with reference to FIG. 2 above. In a similar manner, the lighting information for pixel B may consider only the contribution of light source 420B.

FIG. 4B illustrates an example representation of a stochastically determined lighting information array 450. As the lighting information array 450 illustrates, the light sources selected for the pixels may be non-uniform. Each cell in the array 450 may correspond to a particular pixel, and the label $L_A$ or $L_B$ stored in each cell represents the particular light source selected for the corresponding pixel (e.g., $L_A$ refers to light source 420A and $L_B$ refers to light source 420B). For example, the lighting information stored in cell 460A is associated with pixel A, which is associated with light source 420A. As such, the lighting information stored in cell 460A is computed based on the direction and intensity of light source 420A relative to the visible portion 440A of the object 430. As another example, the lighting information stored in cell 460B is associated with pixel B, which is associated with light source 420B. As such, the lighting information stored in cell 460B is computed based on the direction and intensity of light source 420B relative to the visible portion 440B of the object 430. In particular embodiments, the light source(s) for each pixel may be stochastically selected. In other embodiments, the light source(s) selected may be based on one or more rules (e.g., light source 420A may be assigned to every even pixel, and light source 420B may be assigned to every odd pixel). While the example shown in FIGS. 4A-4B illustrates two light sources, the method described herein may be extended to any number of light sources (e.g., 5, 10, 27, or 101 light sources). One of the primary benefits of this approach for capturing lighting information is that the number of light sources present in the environment does not proportionally affect the amount of computation needed. For example, to render an image with m pixels, the rendering system would compute a lighting information array with m corresponding elements, regardless of the number of light sources present in the environment.

Figure 5:
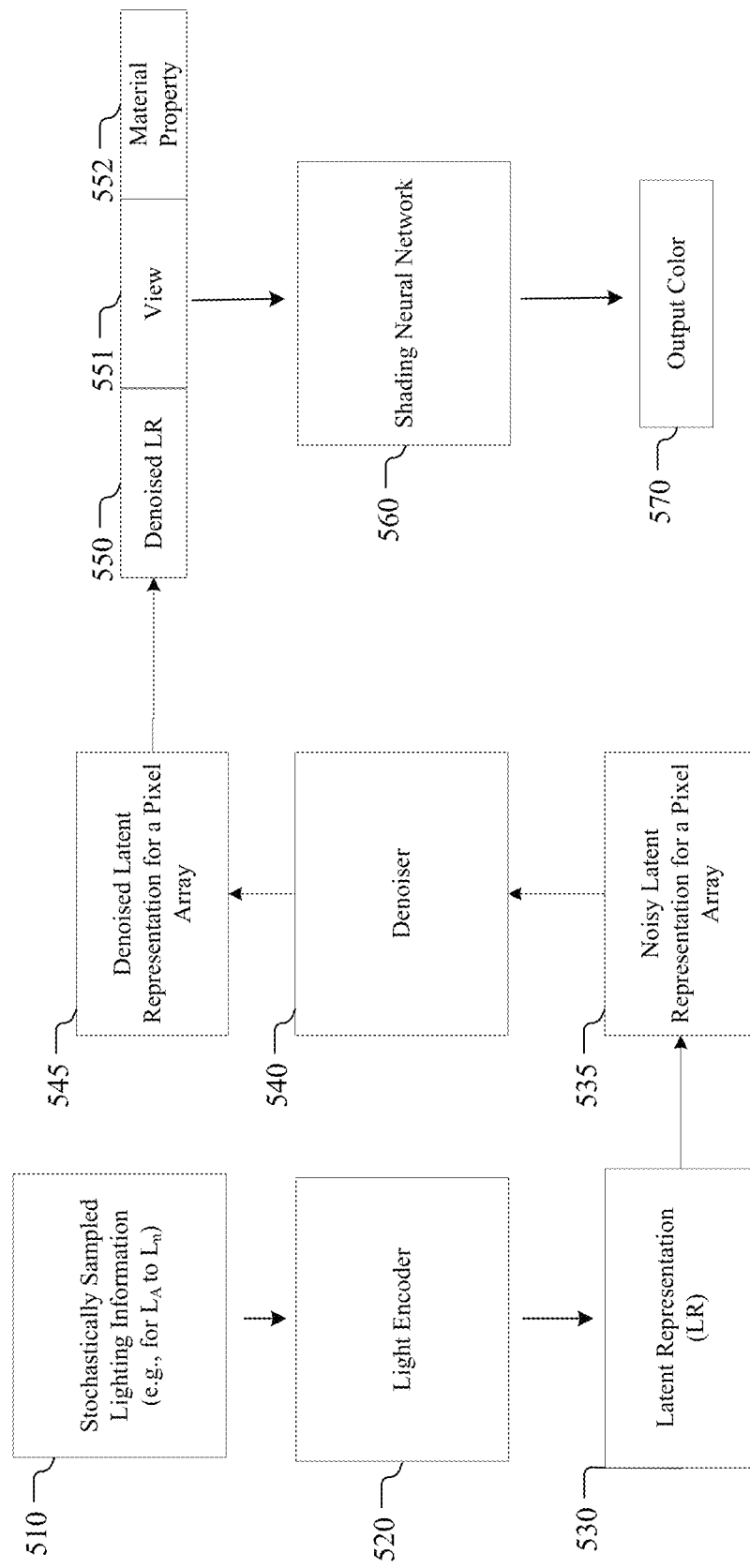
FIG. 5 illustrates an embodiment of a machine-learning shading architecture configured to process stochastically computed lighting information.

FIG. 5 illustrates an embodiment of a machine-learning shading architecture 500 configured to process stochastically computed lighting information. The stochastically sampled lighting information 510 may be generated using the method described with reference to FIG. 4A-B. For example, the rendering system may perform visibility tests (e.g., using ray casting) from the viewpoint of interest to determine per-pixel object visibility. For each pixel, the rendering system may stochastically select a light source and compute the lighting information of that light source relative to the object visible to that pixel. When considered as a whole, the resulting stochastically sampled lighting information of all the pixels is considered to be noisy since the information associated with each pixel only considers the contribution of the associated selected light source and not others. However, although the collection of lighting information of all pixels does not include the contributions of all light sources relative to each individual pixel, the collection of lighting information as a whole includes samples of the contributions of all light sources.

Stochastically sampled lighting information 510 for each pixel may be encoded using a light encoder 520, similar to the one described with reference to FIG. 3. In particular embodiments, the light encoder 520 may be configured to encode the lighting information of a single pixel; in other embodiments, the light encoder 520 may be configured to encode the lighting information of multiple pixels simultaneously. The light encoder 520 may be trained to encode light information in a latent space. As previously described, the light encoder 520 may be trained using an encoder-decoder model. The output of the light encoder is a latent representation 530. In an embodiment where the encoder 520 performs encoding for one pixel at a time, the latent representation may include a single latent vector for that pixel. In other embodiments where the encoder 520 is configured to perform encoding for multiple pixels simultaneously, the latent representation of the lighting information 510 may include an array of latent vectors, which are each associated with a pixel. For example, the lighting information associated with a particular pixel $p_i$ may be encoded as a latent vector vi.

The output of the light encoder 520 may be used to form a noisy latent representation for a pixel array 535. For example, the noisy latent representation may include the latent vectors associate with all the pixels in the image being rendered. The noisy latent representation 535 is considered to be "noisy" because each latent vector vi in the latent representation 535 only encodes the lighting information associated with the light source selected for the corresponding pixel $p_i$, even though other light sources in the environment may also emit light that is incident on the object $o_i$ visible to pixel $p_i$.

In particular embodiments, the noisy latent representation 535 may be processed by a denoiser 540 to generate a denoised latent representation for the pixel array 545. The denoiser 540, which may be a machine-learning model (e.g., a neural network), may be tasked with using the latent vectors associated with neighboring pixels to compute the contribution of all light sources in the environment. The output of the denoiser 540 is a denoised latent representation for the pixel array 545. Conceptually, the denoised latent representation 550 may include a latent vector per pixel that encodes the contribution of all light sources.

A shading neural network 560 may be configured to process environmental data, including the denoised latent representation 550, view direction 551, and material properties 552 of visible objects associated with each pixel, to generate the color of each pixel 570. In particular embodiments, the shading neural network 560 may be configured to process on a per-pixel basis (e.g., determining the color of a single pixel at a time); in other embodiments, the shading neural network 560 may be configured to generate the colors of multiple pixels simultaneously.

As previously discussed, each pixel may be associated with a portion of an object that is visible to the pixel (in other words, the visible portion is to be displayed by the pixel). Parameters associated with the visible portions of objects may be used as the input for the shading neural network 560. For example, the network 560 may be provided with the denoised latent representation 550 associated with one or more pixels, which encodes per-pixel lighting information associated with the light sources in the environment. Viewing direction 551 of the camera/viewer relative to a visible portion associated with each of the one or more pixels may also be provided to the shading neural network 560 (e.g., the viewing direction associated with each pixel $p_i$ may be represented by a direction vector pointing towards the camera/viewer from the visible portion of an object $o_i$). Material properties 552 of the visible portion associated with each of the one or more pixels may further be provided to the shading neural network 560. For example, for each pixel $p_i$, the material properties of the visible portion of an object $o_i$ may be provided. The material properties associated with the visible portion may also include light-reflectance properties, which influence the color that would be observed. Other examples of material properties may include measures for metallic properties, roughness, specular reflectance, clearcoat, clearcoat roughness, refractive index, normal vector and any other suitable measures of material property. The material properties may be physically-based (e.g., defined so that the material properties correspond to the actual physical material properties of an object, such as wood or glass) or defined in any desired manner (e.g., the material properties of a virtual object could have any desired material properties unconstrained by reality or physics).

This pipeline of rendering as described with reference to FIG. 5 has several advantages. One advantage is that the rendering is physically-based since the shading network is trained to output pixel color based on physics data (e.g., light information, view direction, and material properties). This allows the resulting results to be more realistic. Another advantage of this pipeline is that computation complexity is independent of the number of light sources. As previously explained, in this method, contributions from the various light sources are stochastically sampled into a single lighting information array. Thus, regardless of the number of light sources, the cost for generating the lighting information array and the corresponding latent representation is fixed. To ameliorate the noisy nature of such an array, the pipeline introduces a denoiser to generate a denoised latent representation of lighting information. The denoiser is configured to denoise the noisy latent representation only, rather than denoise the end color results. Such a configuration allows the denoiser to not be material-dependent, which allows the denoiser network to be smaller and simpler and more flexible to train. In addition, having the denoising process occur earlier in the pipeline, rather than after the pixel colors are generated, reduces over-blurring of the final image.

In particular embodiments, the light encoder 520 and the shading network 560 may be trained in an end-to-end manner. The training data may include a sufficiently large number of training samples that each includes the environmental parameters associated with each pixel (e.g., lighting information of various light sources, view direction, material properties, etc.). The training target (the "ground truth") for each training sample may be computed based on the per-pixel BRDF (Bi-directional Transmission Distribution Function) and intensity of each light source. For example, the ground truth target image may be computed by summing the product of the BRDF and intensity associated with each pixel. Alternatively, the training target may be an image of the same scene generated using a traditional graphics rendering pipeline.

In particular embodiments, each training iteration may include encoding the lighting information of a particular training sample using the light encoder 520. Each light source may have a corresponding lighting information array, which would be encoded as a latent representation by the light encoder 520. Thus, if there are n light sources, n corresponding latent representations would be generated. The latent representations may then be combined to generate a combined latent representation. The shading network 560 may process the combined latent representation, along with per-pixel view directions and material parameters, to generate colors for one or more pixels. The each generated pixel color may be compared to the corresponding pixel color of the ground truth target image (e.g., using mean-squared error or any other suitable loss function) to assess the performance of the encoder 520 and shading network 560. The encoder 520 and shading network 560 may be updated according to the comparison results. The updated encoder 520 and shading network 560 may be trained in the same manner again in the next iteration of training. Training may terminate when a termination condition is met, such as when a sufficiently large number of training samples have been used or when the comparison result satisfies one or more criteria (e.g., the mean-square error is lower than a threshold).

In particular embodiments, once the light encoder 520 and the shading network 560 are trained, they may be used to train the denoiser 540. In particular embodiments, the denoiser may be trained using Noise2Noise or any other suitable training techniques. For example, supervised training could be employed where ground truths are available. For example, a latent information array that includes stochastically sampled lighting information may be generated and encoded using the light encoder 520. The resulting latent representation may be processed by the denoiser 540 to generate a denoised latent representation. The denoised latent representation may be processed by the shading network 560 to generate pixel colors. Each pixel color may then be compared to a corresponding pixel in a ground truth image using any appropriate loss function (e.g., mean-square error) to assess how well the denoiser 540 worked. The ground truth may be an image generated using a traditional physics-based rendering pipeline. Based on the comparison between the ground truth and the pixel colors generated using the denoised latent representation, parameters of the denoiser 540 may be updated. This process may repeat through several iterations using different training data until a termination condition is met. For example, training may terminate when a sufficiently large number of training samples have been used or when the comparison result satisfies one or more criteria (e.g., the mean-square error is lower than a threshold).

Figures 6A, 6B:
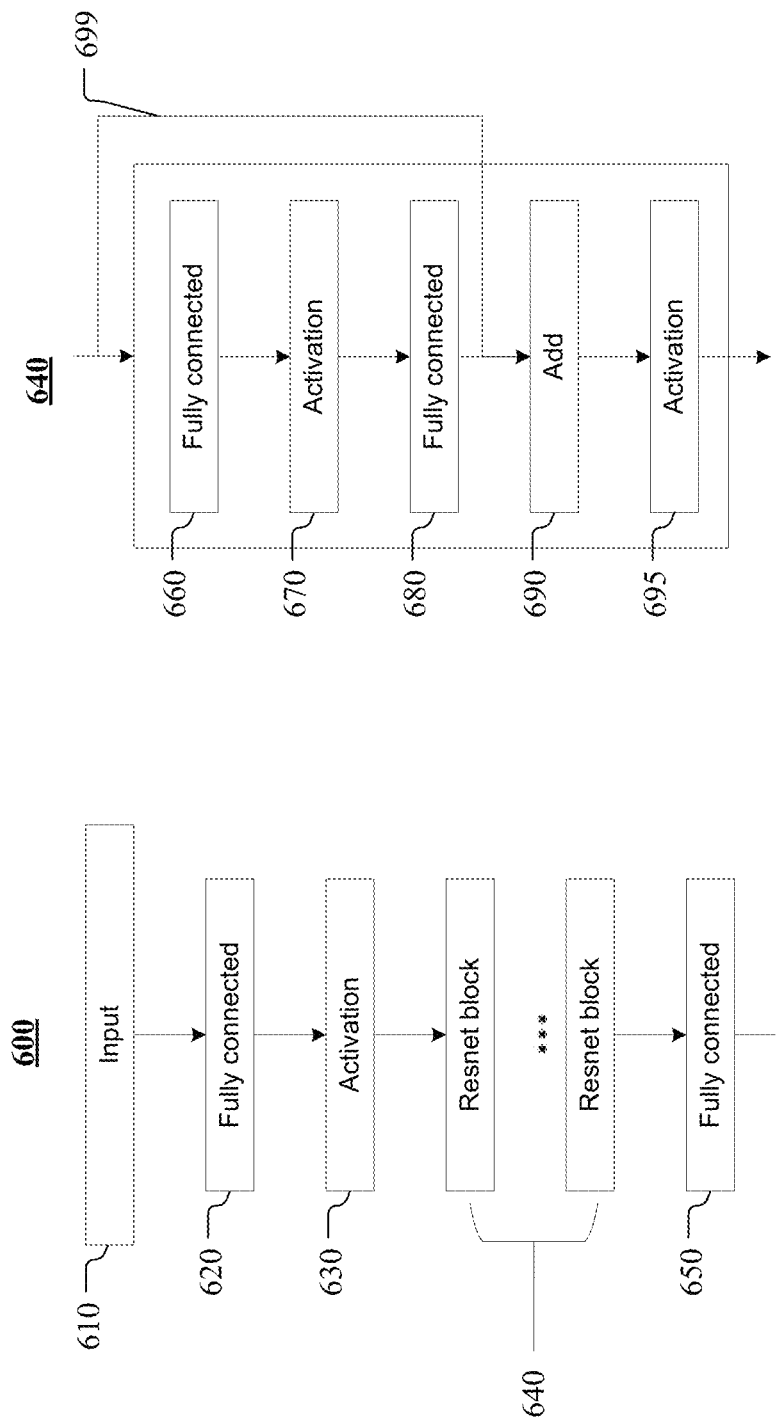
FIGS. 6A and 6B illustrate examples of neural-network architectures that may be used in particular embodiments.

In particular embodiments, the neural networks described herein (e.g., shading neural network) may have several layers. FIGS. 6A and 6B illustrate examples of neural-network architectures that may be used in particular embodiments. FIG. 6A illustrates an example neural-network architecture 600. The neural network having this architecture 600 may receive an input 610, such as the aforementioned latent representation of lighting information, view directions, and material properties associated with a pixel array. The network may process the input data using a fully-connected layer 620. The output of the fully-connected layer 620 may be processed by an activation block 630. The output of the activation block 630 may then be processed by one or more Resnet blocks 640. The output of the last Resnet block 640 may then be processed by a fully-connector layer 650, which outputs the inferred or predicted result (e.g., the color values or color weights/intensities). FIG. 6B illustrates an embodiment of each Resnet block 640. Each Resnet block 640 may process its input using a fully-connected layer 660, followed by an activation layer 670, and followed by another fully-connected layer 680. The output of the last fully-connected layer 680 may then be added 690 with the input of the Resnet block 640 through a skip connection 699. The output of the add block 690 may then be processed by another activation layer 695, which in turn may output the result to the next Resnet block 640 or the fully connected layer 650 shown in FIG. 6A. The Resnet blocks allow for deeply-stacked smaller layers, which helps with redundancy inside of the network. While these figures show a particular network architecture, this disclosure contemplates any other suitable network architecture as well.

Figure 7:
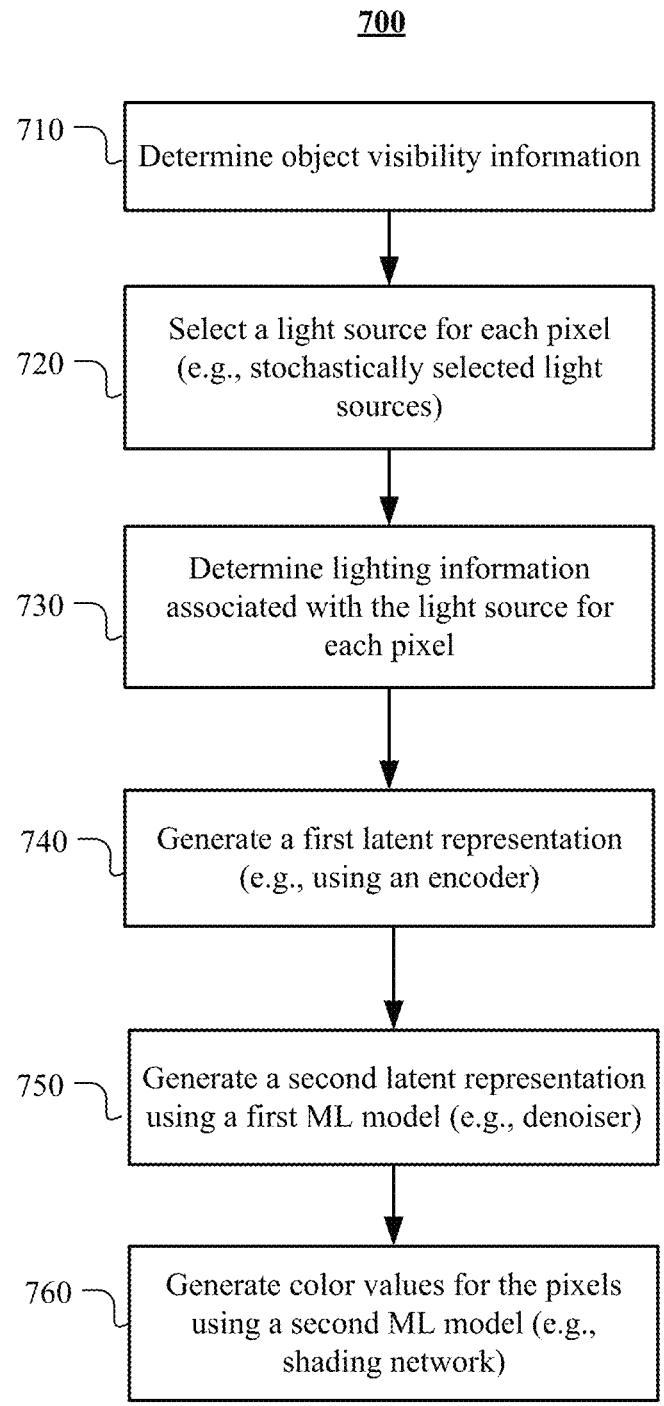
FIG. 7 illustrates a machine-learning-based method for shading, in accordance with particular embodiments.

FIG. 7 illustrates a machine-learning-based method 700 for shading, in accordance with particular embodiments. At step 710, a computing system may determine, for each of a plurality of pixels, object visibility information based on one or more objects in a virtual environment. At step 720, the system may select, for each of the plurality of pixels, a light source from a plurality of light sources in the virtual environment. The light sources may be selected stochastically, resulting in the pixels being associated with non-uniform light sources. At step 730, the system may determine, for each of the plurality of pixels, lighting information associated with the light source selected for that pixel based on the associated object visibility information. The resulting lighting information for the pixel array, when considered as a whole, may be considered to be noisy, given the stochastically sampled light sources that the array of information corresponds to. The lighting information associated with each of the plurality of pixels may include a lighting direction and intensity associated with the light source selected for that pixel. The lighting direction associated with the light source selected for each of the plurality of pixels may be determined based on a position of the light source in the virtual environment and the object visibility information associated with that pixel, which specifies a portion of an object in the virtual environment that is to be displayed by that pixel. At step 740, the system may generate a first latent representation of the lighting information associated with the plurality of pixels. The first latent representation may include a plurality of first latent vectors corresponding to the lighting information associated with the plurality of pixels, respectively. The first latent representation may be considered to be noisy. Each of the plurality of first latent vectors in the first latent representation may encode lighting information of a single one of the plurality of light sources. An encoder may be configured to generate one latent vector at a time, or alternatively the encoder may be configured to generate multiple latent vectors simultaneously. At step 750, the system may generate a second latent representation by processing the first latent representation using a first machine-learning model trained to denoise latent light representations. The second latent representation may include a plurality of second latent vectors associated with the plurality of pixels, respectively. At least one of the plurality of second latent vectors in the second latent representation encodes lighting information of more than one of the plurality of light sources. At step 760, the system may generate color values for the plurality of pixels by processing at least the second latent representation using a second machine-learning model (e.g., shading network). The second machine-learning model may also process a plurality of material properties associated with one or more objects in the virtual environment that are to be displayed by the plurality of pixels. The shading network may be configured to generate one pixel color at a time, or alternatively the shading network may be configured to generate multiple pixel colors simultaneously.

Traditional method for rendering objects in an environment illuminated by ambient light is not efficient. For example, for each pixel corresponding to a visible portion of the rendered object, the traditional rendering method may need to consider the ambient light from all possible directions to determine the color value for that pixel. The ambient light from each possible direction may need be considered as an independent light source and may need to be calculated separately. As a result, the rendering process may be computationally expensive and slow.

To solve these problems, particular embodiments of the system may use a first machine-learning (ML) model (e.g., a ML-based ambient light encoder) pre-trained based on the ambient light data of the environment to generate latent space representation which can be used by a second ML model (e.g., a shading network) to determine the color values of the pixels to be displayed (e.g., pixels of visible portions of the object to be rendered). For training the first ML model, the system may first generate an environmental map (e.g., a panorama image or picture capturing lighting information of all directions of the environment) to capture the ambient lighting information of a particular environment (e.g., an open space with sun light). The system may generate random pixel samples for training purpose. Each pixel may be associated with a view direction and a surface orientation. For example, the view direction may correspond to a vector pointing from the camera or eye position corresponding to the viewpoint of the viewer to an intersection position on the virtual object. The surface orientation may be a normal direction of the object surface at the intersection position of the virtual object.

In this disclosure, the term "intersection position" may refer to an intersection position on the virtual object surface that intersects with a particular view direction line (e.g., a casted ray). Each intersection position may be associated with a corresponding pixel and the information associated with that intersection position may be used to determine the pixel value for that associated pixel. In this disclosure, the term "pixel position" may refer to a pixel position within an array of pixel of an image of the virtual object. In particular embodiments, the system may project or cast rays from the viewpoint (e.g., a camera position or eye position) of the viewer along different view directions toward the virtual object. The casted rays (view directions) may intersect with the surface of the virtual object. An intersection position on the surface of the virtual object may be visible through a corresponding pixel position in the image and may be presented by the corresponding pixel in the image.

During the training process, the system may feed the pixel samples (with corresponding view directions and surface orientations) and the environmental map to the first ML model for training purpose. The first ML model may generate a latent space representation representing the ambient lighting information of the environment corresponding to view directions and surface orientations of the pixel samples. Then, the system may feed the latent space representation to the second ML model (e.g., the shading network) which may receive the material properties for each pixel of interest and determine the corresponding color values for these pixels. The color values determined by the shading network may be compared to ground truth results (e.g., which may be determined by traditional ray-casting method or determined by measurement of a real-world object placed in the real-world environment). The different between the color values determined by the shading network and the ground truth may be processed by a loss function and may be fed back to the first ML model (e.g. the ambient light encoder) to allow the first ML model to adjust it parameters to minimize the difference between the output colors and the ground truth. The first ML model may be trained with sufficient training pixel samples to allow the difference between the output color values and the ground truth to be within a pre-determined threshold range. As a result, the first ML model after being trained may capture the ambient lighting information of the environment as represented by the environmental map and may be used to render objects illuminated by the ambient light of the environment.

At inference time, the system may first determine the visible portion(s) of the object of interest to be rendered. Then, the system may determine, for each pixel in the visible portion(s), a view direction (e.g., a camera direction or an eye direction) and a surface orientation (e.g., a surface normal). After that, the system may feed these view directions and surface orientations to the first ML model that has been trained by the ambient light data. The first ML model may generate a latent space representation for the ambient light of the environment and feed the latent space representation to the shading network to determine the corresponding color values.

By using the ML model to capture the ambient light information of the environment and using the latent space representation generated to determine the output color values, particular embodiments may greatly reduce the computation amount that is needed to render virtual objects in the environment as illuminated by the ambient light of the environment. By using the ML model to generate the latent space representation to represent the ambient lighting information, particular embodiments may allow the luminance contributions of the different light sources, including the ambient light and other point light sources, to be combined accumulatively and provide scalability for the system to handle complex rendering scenarios. By reducing the amount of computation needed for rendering the virtual objects, particular embodiments may greatly reduce the power and time that are needed for the rendering process and improve the user experience of the AR/VR devices. By using ML models instead of the traditional rendering method, particular embodiments may allow the rendering process to performed at a higher speed taking advantage of the hardware architecture designed and optimized for running ML models.

Figures 8A, 8B:
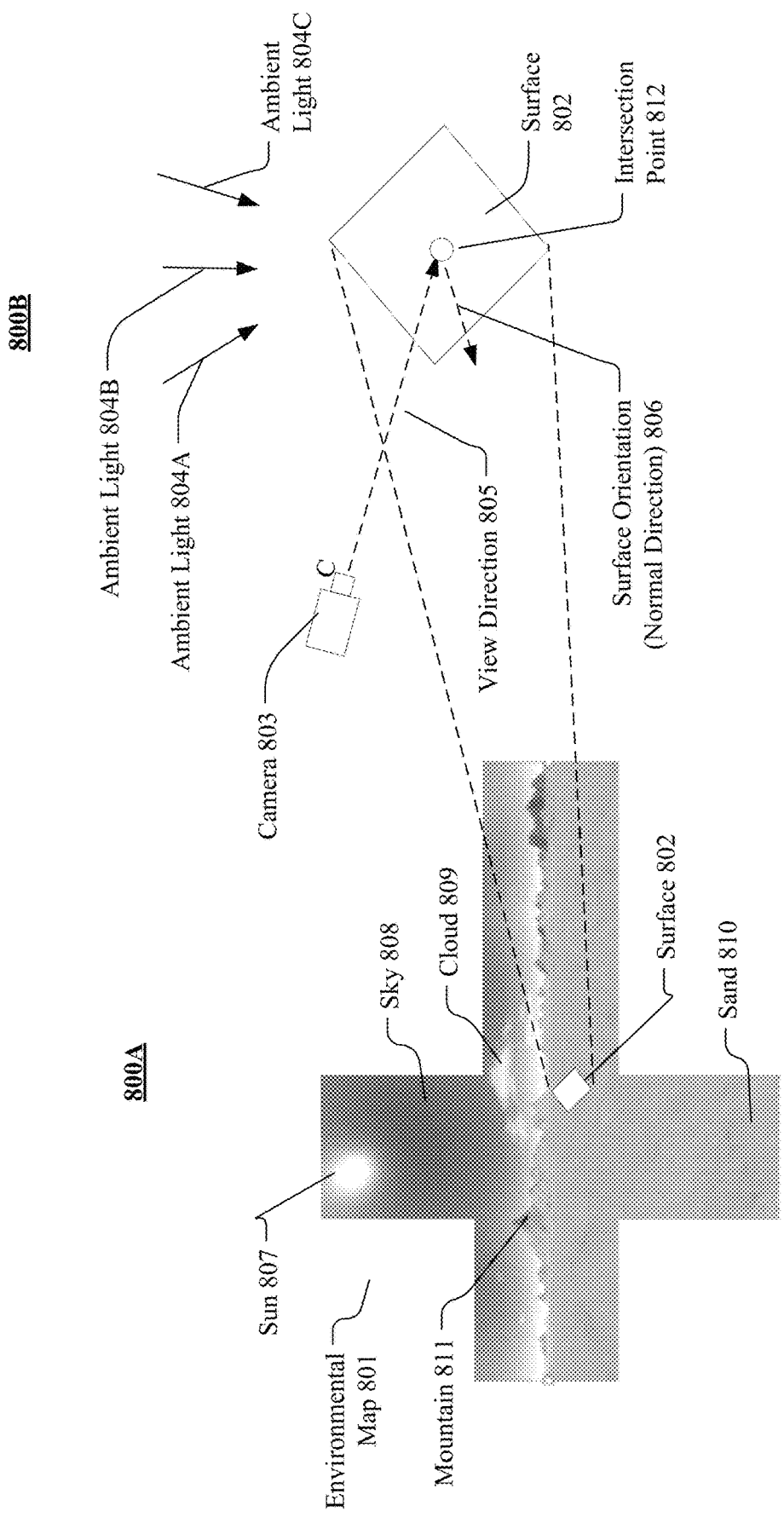
FIG. 8A illustrates an example environmental map that can be used for training the ambient light encoder.
FIG. 8B illustrates an example surface that can be used to determine the color value for an associated pixel within a visible portion of the virtual object to be rendered in the environment.

FIG. 8A illustrates an example environmental map 801 that can be used for training the ambient light encoder. In particular embodiments, the system may use a ML model (e.g., neural networks) as an ambient light encoder to capture the ambient light information of the environment during a training process. For the ML training purpose, the system may generate an environmental map to capture the ambient lighting information of the environment from all possible directions. As an example and not by way of limitation, the environment as shown in the environment map 801 may be related to a desert scene including the sun 807, the sky 808, cloud 809, sand 810, mountain 811, etc. The environmental map 801 may include one or more images or pictures of the environment that are captured from different directions. These one or more images or pictures of the environment may form or correspond to a cube corresponding to the 3D space of the environment. It is notable that the environmental map 801 is for example purpose only and the environmental map that can be used to train the ambient light encoder is not limited thereto. For example, the environmental map may include a panorama picture (e.g., a spherical panorama picture) of the environment that captures the ambient lighting information from all directions. In particular embodiments, the environmental map may include pictures that are captured by cameras. In particular embodiments, the environmental map may include images that are generated or rendered by computer. In this disclosure, the term "ambient light" may refer to environment light or surrounding light in the surrounding environment. The light sources of the ambient light may be relatively far from (e.g., farer than a threshold distance) the location of the virtual object to be render so that the light beams from a particular ambient light may be considered approximately parallel to each other. The term "point light sources" may refer to light sources that are relatively closer (e.g., within a threshold distance) to the location of the virtual object to be rendered. The light beam direction from a particular point light source may depend on the relative position of the point light source with respect to the location of the virtual object to be rendered.

In particular embodiments, the system may need to render a virtual object in a virtual environment or a real environment that is associated with different light sources. For example, the environment may have one or more light sources (e.g., point light sources) that are relatively close to the object to be rendered (e.g., within a threshold distance). The luminance of the object by these light sources may depend on the relative position and distance of the object with respect to the respective light sources. Therefore, the system may not be able to pre-train ML model to capture the lighting information of these light sources. Instead, the system may determine the object luminance by these light sources dynamically before or during the rendering process of the virtual object (after the position of the virtual object is determined).

However, the environment may also include ambient light caused by the light sources that very far from the virtual object to be rendered (e.g., beyond a pre-determined threshold distance). Because these light sources are very far from the virtual object to rendered, particular embodiments of the system may assume the ambient light sources are infinitely far from the object to be rendered to simplify the modeling process. As a result, the light beams of the same ambient light source (e.g., the sun) may be assumed as parallel with respect to each other. The position of the object may not affect the luminance result by the ambient light. For example, a virtual object to be rendered at a first position in the environment may have the same luminance result with when the virtual object is rendered at a different position in the environment. The luminance result (e.g., output color values of visible pixels) may depend on the associated view directions (e.g., camera direction or eye direction) and surface orientations at the positions of corresponding pixels but may be independent from the virtual object position within the environment. As a result, the ambient light in the environment may be considered as static and may be captured by the ML-based ambient light encoder during the training process.

In particular embodiments, the term "surface" may refer to a mathematical "surface" used to determine the output colors for the pixels associated with the visible portions of the virtual object. In particular embodiments, the system may determine a surface for each pixel associated with the visible portion of the virtual object. The surface for a particular pixel may be determined based on the pixel location and the shape of the virtual object at that pixel location. The surface orientation may be described by a normal direction of the surface. For example, for a pixel associated with a particular unit of a mesh grid of the virtual object model, the surface may correspond to an associated mesh grid surface associated with that particular pixel location. As another example, for a pixel associated with an external convex surface of the virtual object, the surface may correspond to the external tangent surface of the object shape at that particular intersection position of the view direction and the virtual object surface. As another example, for a pixel associated with a flat external surface of the virtual object, the surface may correspond to the flat external surface of the virtual object at that view-direction-object intersection position. As another example, for a pixel associated with an external concave surface of the virtual object, the corresponding surface may correspond to the internal tangent surface of the object shape at that view-direction-object intersection position. After the surface for a particular pixel is determined, the system may determine a vector (starting from the view-direction-object intersection position pointing toward the external of the virtual object surface) to describe the normal direction of the surface.

FIG. 8B illustrates an example surface 802 that can be used to determine the color value for an associated pixel within a visible portion of the virtual object to be rendered in the environment. As an example and not by way of limitation, the surface 802 may be associated with a visible portion of a virtual object to be rendered. The system may determine the surface orientation 806 as described by a vector along the normal direction of the surface. To determine the color value for the pixel corresponding to the intersection position 812 of the surface 802, the system may need to consider all light sources in the environment including the ambient light sources and other light sources (e.g., point light sources). In this example, the major ambient light source may be the sun. However, all other things (e.g., sky 808, cloud 809, sand 810, mountain 811, etc.) in the scene may also reflect light and function as ambient light sources. Therefore, to determine the color value for the pixel corresponding to the intersection position 812, the system may need to consider the ambient light from all possible directions (e.g., 804A, 804B, 804C) in the environment.

Ideally, the system may need to consider each pixel in the environmental map 801 as a separate ambient light source and factor that in when determining the color value for the pixel corresponding to the intersection position 812. If the traditional rendering method is used, the system may need to calculate the luminance contribution of each pixel as a separate ambient light source in the environmental map 801. As a result, the system may encounter huge amount of computation for determining the color values for the visible pixels of the virtual object. As discussed in later sections of this disclosure, particular embodiments of the system may use a ML-based encoder to encode the environmental map 801 during the training process and use the ML-based encoder to generate latent space representation to capture the ambient lighting information of the environment. Then, the system may feed the latent space representation to a shading network (e.g., another ML model) to determine the color values for the visible pixels of the virtual object. In this way (rather than calculating the luminance contribution of each direction separately), the system may greatly reduce the amount of computation that is needed for determining the pixel color values for the virtual object. Furthermore, by using the ML-based encoder and ML-based shading network, the system may take advantage of the hardware architecture as illustrated in the FIG. 1, which is designed and optimized for running ML models, to process the data in a high speed and greatly reduce the amount of time that is needed for rendering the virtual object.

Figure 9:
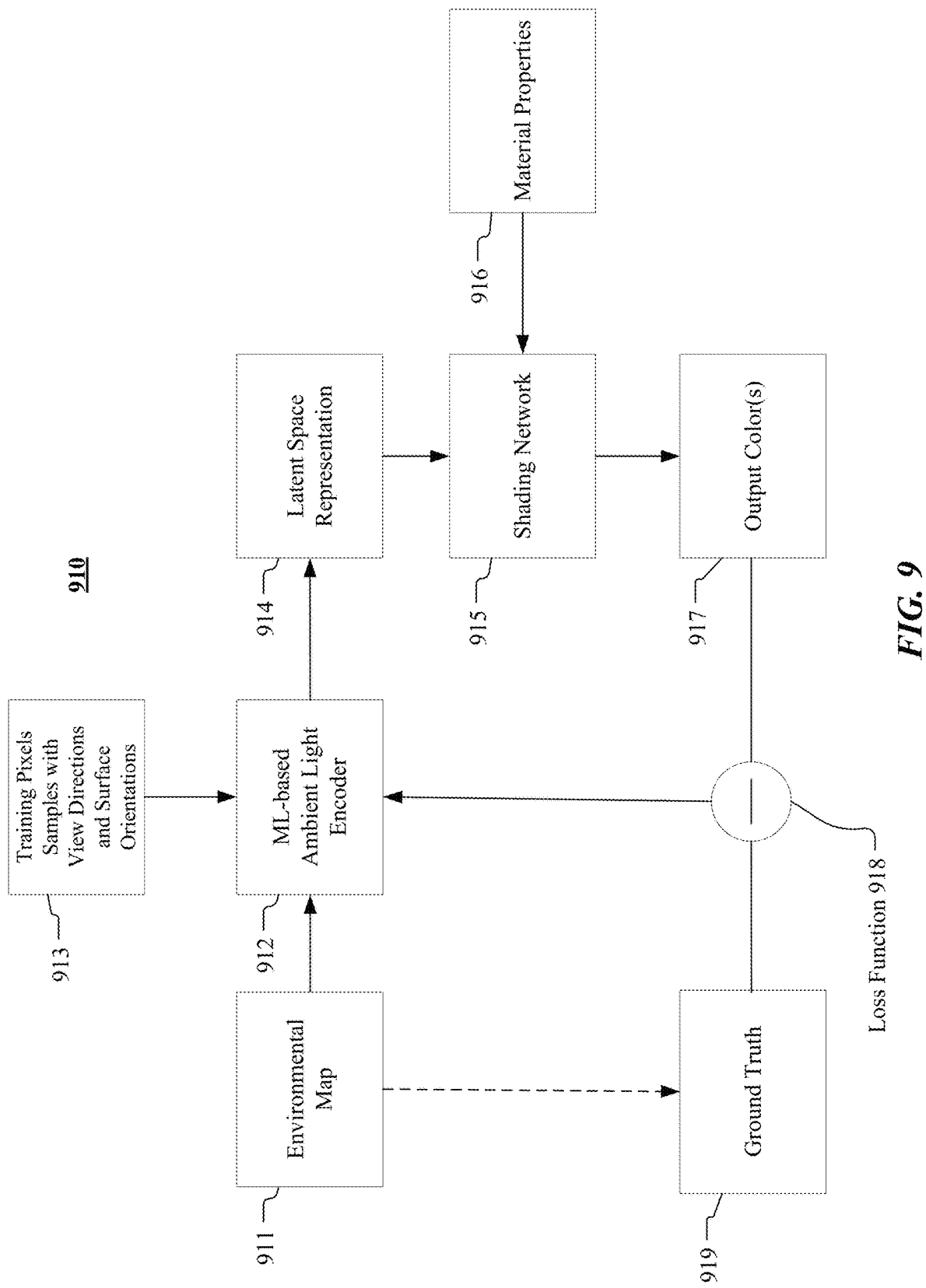
FIG. 9 illustrates an example process for training the machine-learning-based ambient light encoder to capture the ambient lighting information.

FIG. 9 illustrates an example process 910 for training the machine-learning-based ambient light encoder to capture the ambient lighting information. As an example and not by way of limitation, the system may first generate an environmental map 911 to capture the ambient light information of the environment. As described earlier, the environmental map 911 may include one or more panorama images or pictures of the environment of interest. For example, the environmental map 911 may include a number of pictures forming a cube representing the 3D space of the environment and capture the ambient light information from all directions. As another example, the environmental map 911 may include one or more spherical panorama pictures that capture ambient light information from all directions. As another example, the environmental map 911 may include a number of pictures that collectively capture the ambient light information of the environment from all directions.

In particular embodiments, the system may use a ML-based ambient light encoder 912 (also referred to as "ambient light encoder") to capture the ambient lighting information of the environment in which the virtual object is to be rendered. In particular embodiments, the ambient light encoder 912 may be a neural network. For training purpose, the system may first generate an environmental map 911 (e.g., a panorama image or picture capturing lighting information of all directions of the environment) to capture the ambient lighting information of the environment. Then, the system may generate training pixel samples 913 for training the ML model of the ambient light encoder 912. For example, the training pixel samples 913 may include randomly generated or/and randomly selected pixels associated with a visible portion of a hypothetical object. As another example, the training pixel samples 913 may include randomly generated or/and randomly selected pixels of a hypothetical object surface fragment. As another example, the training pixel samples 913 may include randomly generated or randomly selected pixels of a set of sample pixels. Each training pixel sample may be associated with a view direction and a surface orientation. The view direction of a pixel may be represented by a view direction vector pointing from the camera position or eye position corresponding to the viewpoint of the viewer to the position of the pixel of interest. The surface orientation of a pixel may be represented by a surface orientation vector representing the normal direction of the surface at the intersection location corresponding to that pixel.

In particular embodiments, during the training process, the system may feed the environmental map 911 and the training pixel sample 913 (with the corresponding view directions and surface orientations) into the ambient light encoder 912. The ambient light encoder 912 may generate the latent space representation 914 based on the environmental map 911 and the training pixel samples 913 that are fed into the ambient light encoder 912. The latent space representation 914 may include, a latent space vector for each pixel (corresponding to an intersection position) that is associated with the visible portion of the virtual object. The latent space vectors may include, for each surface orientation of a corresponding training pixel sample, the ambient light information from all directions of the environment, as viewed from the corresponding view direction. Then, the system may feed the latent space representation 914 and the material properties 916 at the corresponding pixel locations to the shading network 915. In particular embodiments, the material properties 916 may include, for example, but not limited to, metallic properties, roughness, specular reflectance, clearcoat, clearcoat roughness, refractive index, and any other suitable measures of material property. The material properties may be physically-based (e.g., defined so that the material properties correspond to the actual physical material properties of an object, such as wood or glass) or defined in any desired manner (e.g., the material properties of a virtual object could have any desired material properties unconstrained by reality or physics).

In particular embodiments, the shading network 915 may generate the output colors 917 for these training pixels. For example, for a particular training pixel, the shading network 915 may determine, based on the latent space representation 914 and the material properties 916, the output color for that training pixel as viewed from the associated view direction considering the luminance by the ambient light from all possible directions of the environment. The output color 917 of a particular training pixel may be determined based on the light intensity of the ambient light that is reflected toward the camera position or eye position of the viewer along the view direction, from the surface associated with that particular pixel. The light intensity of the reflected ambient light may depend on the luminance by the ambient light from all possible directions of the environment, the view direction (and the view distance if the light is attenuated during transmission), and the reflective properties of the surface. Then, the system may compare the output colors 917 to the ground truth 919 using a loss function 918. After that, the system may feed the difference between the output colors 917 and the ground truth 919 as processed by the loss function 918 back to the ML-based ambient light encoder 912. The ML-based ambient light encoder 913 may adjust its model parameters (e.g., network weights) to minimize the difference between the output colors 917 generated by the shading network 915 and the ground truth 919 for the output colors 917. The training process may be repeated and the ML-model parameters of the ambient light encoder 912 may be adjusted during each training iteration. In particular embodiments, the ML-based ambient light encoder 912 may be trained with sufficient training pixel samples and sufficient interactions to allow the rendering pipeline (including the ML-based ambient light encoder 912 and the shading network 915) to generate output colors that are within a pre-determined threshold range with respect to the corresponding ground truth 919.

It is notable that because the ambient light sources are assumed to be infinitely far from the virtual object. The luminance of a surface in the environment may be independent on the actual position of the surface within the environment. The output color of a particular pixel associated with that surface may depend on the view direction, material properties, and the luminance level of the surface by the ambient light of the environment but may be independent from the position of that surface within the environment. Therefore, the training result for a particular surface at a particular location within the environment may be applicable to any other surfaces at other locations within the environment but have the same surface orientation. Thus, the actual positions of the training pixel samples may not affect the training result of the ML-based ambient light encoder 912 and the training pixel samples may not need to cover a large number of positions with the environment. However, because the luminance of the surface by the ambient light of the environment depends on the associated surface orientation within the environment, the training pixel samples may need to cover sufficient surface orientations to cover all possible surface orientations with a particular angular resolution. In particular embodiments, the system may use an algorithm to generate random training samples corresponding to different surface orientations with the 3D space of the environment. When the number of training samples is sufficiently large, all possible surface orientations in the 3D space of the environment may be covered by the training samples with a particular angular resolution. Furthermore, because the output color of the pixel depends on the view direction of the camera or human eye, the training samples may need to cover all possible view directions in the 3D space of the environment. The system may use an algorithm to generate random training samples corresponding to different surface orientations within the 3D space of the environment. When the number of the training samples is sufficiently large, the training samples may cover all possible view directions in the 3D space of the environment with a particular angular resolution.

It is notable that the ML-based ambient light encoder that is trained based on the environmental map of a particular embodiment may be specific to that particular environment. If the system needs to render a virtual object in a different environment, the system may need a separate ML-based ambient light encoder that is trained based on the environment map of that different environment. For example, the ML-based ambient light encoder trained for a desert environment (with sun light) may be specific to that desert environment. If the system needs to render a virtual object beyond this desert environment, the system may need another ML-based ambient light encoder that is trained by the environmental map of the new environment. In particular embodiments, the shading network 915 may be a separate ML model which is trained separately and may be kept constant during the training process of the ML-based ambient light encoder 912.

In particular embodiments, the system may generate, for a particular training pixel or a group of training pixels, the ground truth colors using the traditional rendering method (e.g., ray-casting method). A ground truth color for a particular training pixel may depend on the reflected light intensity by the surface associated with that particular training pixel toward the camera or the viewer's eye along the view direction. For example, the system may calculate, for a particular training pixel, the output color value based on the luminance by the ambient light from all directions of the environment by calculating the luminance contribution by the ambient light of each possible direction separately. The system may consider each pixel (or each subset of pixels) in the environmental map 911 as a separate ambient light source to calculate the overall luminance for the particular training pixel. Alternatively, the system may use a camera to generate a picture of a real world object in the real world environment and determine the actual color value for that particular training pixel based on the picture of the real world object. The real world object used to determine the ground truth color value may have the same shape, size, and material properties as defined by the virtual object to be rendered. The real world environment used to determine the ground truth color value may have the same ambient light corresponding to the environmental map 911 and the real-world object used to generate the picture may correspond to the virtual object to be rendered.

In particular embodiments, the ML-based ambient light encoder and one or more ML-based point light encoders may be trained concurrently during the same training process or may be trained separately in different training processes. As an example and not by way of limitation, an environment may include both ambient light sources and point light sources. The system may generate an environmental map that includes ambient light information of the environment. The system may train the ML-based ambient light encoder using training pixel samples with environmental lighting information from the environmental map using the process as described above. The ground truth output colors of the training pixels may be determined based on associated ambient light information from the environmental map. At the same time, the system may use the same training pixels samples but with lighting information of the one or more point light sources in the environment to train the point light encoder. The system may feed these training pixel samples to the point light encoder together with the associated lighting information of the point light sources to determine the output colors for these training pixels based on the initial or current weight values the point light source encoder. After that, the system may compare the output colors to ground truth output colors for these pixels. The ground truth output colors may be determined based on the lighting information of the corresponding point light sources. Then, the system may use a loss function to determine the difference between the current output color and the corresponding ground truth output colors and feed the difference to the ML-based point light encoder to adjust the model parameter values. The model parameters values may be adjusted in a manner which minimizes the difference between the output colors and the ground truth output colors. The system may repeat this training process many times and train the ML models with sufficient large number of training samples until the difference between the output colors and the ground truth output colors are within a pre-determined threshold range. As a result, the ambient light encoder and the point light encoder may be trained concurrently during the same training process and using the same training pixel samples (with different lighting information from different lighting sources).

As another example and not by way of limitation, an environment may include both ambient light sources and point light sources. The system may generate an environmental map that includes lighting information from both ambient light source(s) and point light source(s) in the environment. The system may train the ML-based ambient light encoder using training pixel samples with lighting information including both ambient light information (e.g., from an ambient light source such the sun or moon) and point light information (e.g., from one or more point light sources such as flashlight) using the process as described above. The ground truth output colors of the training pixels may be determined based on associated lighting information including both ambient light information (e.g., from an ambient light source such the sun or moon) and point light information (e.g., from one or more point light sources such as flashlight) from the environmental map. At the same time, the system may use the same training pixels samples with lighting information including both ambient light information and point light information to train the point light encoder. The system may feed these training pixel samples to the point light encoder together with the associated lighting information to determine the output colors for these training pixels based on the initial or current weight values the point light source encoder. After that, the system may compare the output colors to ground truth output colors for these pixels. Then, the system may use a loss function to determine the difference between the current output color and the corresponding ground truth output colors and feed the difference to the ML-based point light encoder to adjust one or more of the model parameters. The model parameter may be adjusted in a manner to minimize the difference between the output colors and the ground truth output colors. The system may repeat this training process many times and train the both the ML-based ambient light encoder and the ML-based point light encoder with sufficient large number of training samples until the difference between the output colors and the ground truth output colors are within a pre-determined threshold range. As a result, the ambient light encoder and the point light encoder(s) may be trained concurrently during the same training process and using the same training pixel samples with the same lighting information from different lighting sources in the environment.

Figure 10:
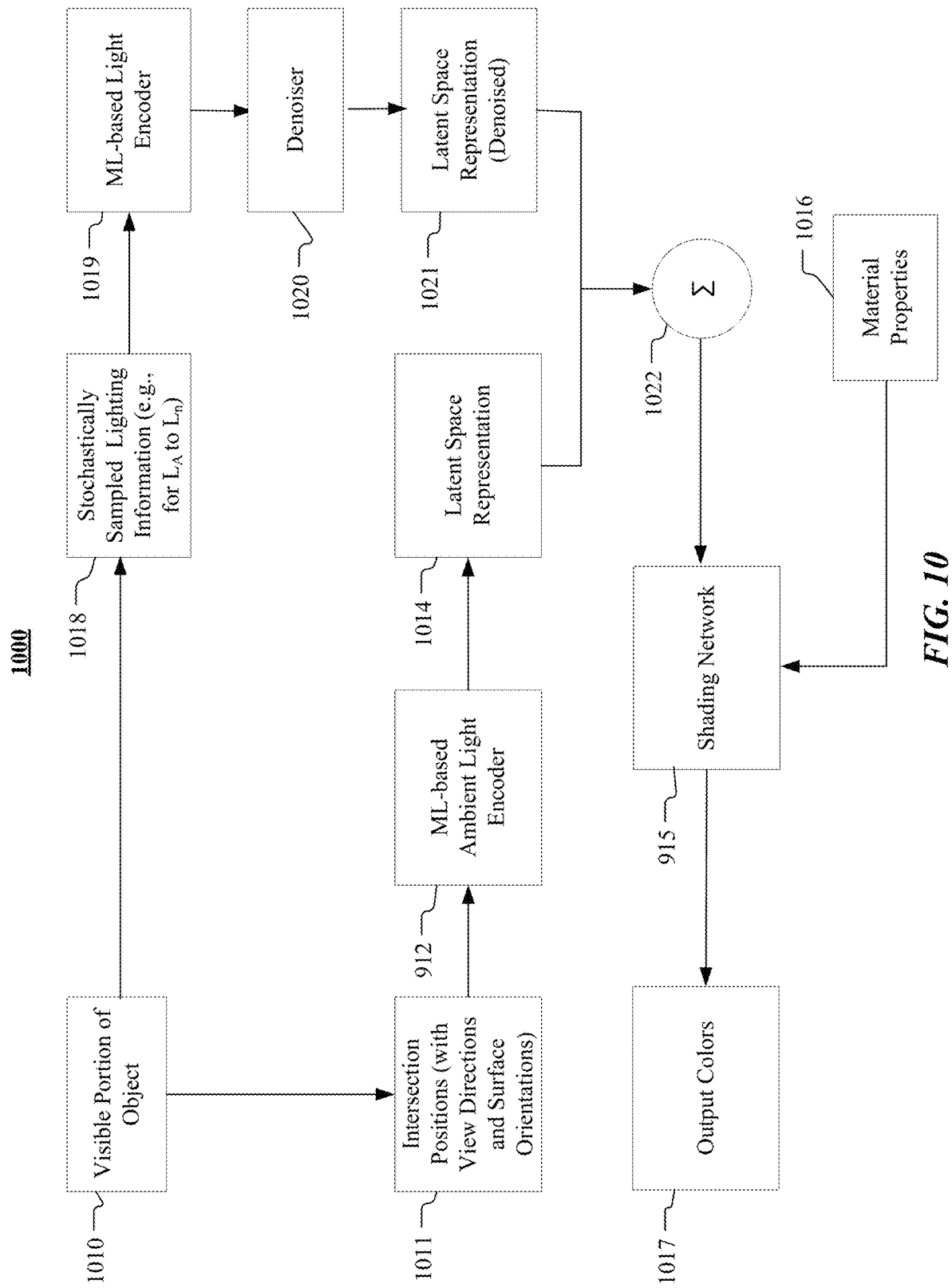
FIG. 10 illustrates an example pipeline for rendering a virtual object using the machine-learning-based light encoders.

FIG. 10 illustrates an example pipeline 1000 for rendering a virtual object using the machine-learning-based light encoders. In particular embodiments, the system may use the ML-based ambient light encoder 912 that has been trained based on the ambient light data of the environment to generate the latent space representation 1014 to render the virtual object. As an example and not by way of limitation, the system may first determine a visible portion 1010 of a virtual object to be rendered. The visible portion may correspond to a particular viewpoint or view direction (as represented by a view direction vector from the camera position or viewer's eye position pointing to a fragment of the visible portion). The system may determine the visible portion 1010 of the virtual object by casting one or more rays from the camera position or the eye position to the virtual object. The visible portion 1010 of the virtual object may correspond to the surface portion(s) of the object that have intersection(s) with the casted rays. For example, a visible portion of the virtual object may correspond to an external surface portion of the object facing toward the camera position or eye position. As another example, a visible portion of the virtual object may correspond an external surface portion that is not hidden by other objects in the environment as viewed from the camera position.

After the visible portion 1010 of the virtual object has been determined, the system may determine one or more intersection positions 1011 associated with the visible portion 1010 of the virtual object. These intersection positions 1011 may correspond to the intersection points of different view directions with the virtual object surface. The information associated with these intersection points 1011 may be used to determine the pixel values of corresponding pixels. For example, the intersection positions may correspond to pixels that can be used to represent the visible portion of the virtual object. The system may determine, for each intersection position associated with the visible portion of the virtual object, a view direction vector and a surface orientation vector for an associated surface. The view direction vector may start from the camera position or the eye position pointing to the intersection position associated with the surface. The surface orientation vector may be a vector pointing toward external of the virtual object along the normal direction of the surface associated with the intersection position corresponding to the pixel of interest.

After the view directions and the surface orientations for the intersection positions have been determined, the system may feed these view directions and corresponding surface orientations to the ML-based ambient light encoder 912 which has been trained based on the ambient light data of the environment. The ML-based ambient light encoder 912 may generate the latent space representation 1014 for these intersection positions based on the corresponding view directions and the surface orientations. The latent space representation 1014 may include, for each intersection position corresponding to each pixel associated with the visible portion of the virtual object, the luminance information by the ambient light of the environment from all possible directions as viewed from the camera position or eye position along the view direction. The latent space representation 1014 may be fed to the shading network 915 to generate the output colors 1017 for the corresponding pixels associated with the visible portion of the virtual object. To generate the output color 1017, the system may feed the material properties 1016 associated with the visible portion of the virtual object to the shading network 915. The shading network 915 may determine the output color 1017 for the pixels associated with the visible portion of the object based on the latent space representation 1014

In particular embodiments, the ML-based ambient light encoder 912 may capture the ambient light information of the environment during the training process. To simplify the computation process, the system may assume the ambient light source(s) is infinitely far from the virtual object being illuminated. As a result, the luminance of a surface may be independent on the actual position of the surface within the environment. The output color of a particular pixel associated with that surface may depend on the view direction, material properties, and the luminance level of the surface by the ambient light of the environment. Therefore, the lighting information of the ambient light in the environment may be static (i.e., will not change according to the position of the virtual object).

In particular embodiments, the environment may also include one or more light sources other than the ambient light sources. For example, the environment may include one or more point light sources that are relatively close (e.g., within a pre-determined threshold distance) to the virtual object being illuminated. Because these light sources are relatively close to the virtual object, the system may not appropriately assume they are infinitely far from the virtual object. For example, the luminance of the virtual object by a light source that is relatively close to the virtual object may depend on the relative position (e.g., distance and angle) of the virtual object with respect to the position of the light source. When the virtual object is closer to the light source, the virtual object may have a higher luminance level. On the contrary, when the virtual object is farer from the light source, the virtual object may have a lower luminance level. Furthermore, in particular embodiment, the light source may be a point light source that emits light to the space uniformly toward all directions. In particular embodiments, the light source may be a directional light source that emits light into the space along a particular direction. In that scenario, the luminance of the virtual object by the light source may depend on the relative position of the virtual object with respect to the emitting direction and field of luminance of the light source.

In particular embodiments, the system may use a separate ML-based light encoder to capture the lighting information of other light sources that are relatively close (e.g., with a pre-determined threshold distance and cannot by assumed to be infinitely far) to the virtual object. For example, after the visible portion of the object 1010 has been determined, the system may use the method and process as described in earlier sections of this disclosure to generate the stochastically sampled lighting information 1018 (e.g., for light sources of $L_A$ to $L_N$) for each pixel associated with the visible portion of the object 1010. The stochastically sampled lighting information 1018 may correspond to one or more point sources in the environment that are within the predetermined threshold distance to the virtual object. Then, the system may feed the stochastically sampled lighting information 1018 to the ML-based light encoder 1019 to generate the latent space representation (not shown) for these light sources in the environment. Since the latent space representation generated based on the stochastically sampled lighting information 1018 is "noisy," the system may use a denoiser 1020 to generate the denoised latent space representation 1021. After that, the system may combine the latent space representation 1014, which captures the ambient lighting information, and the denoised latent space representation 1021, which captures the lighting information of other light sources in the environment. Then, the system may feed the combined latent space representation and the material properties associated with the visible portion of the virtual object to the shading network 915. The shading network 915 may be pre-trained to generate output colors based on the latent space representation and the corresponding material properties.

In particular embodiments, the latent space representation generated by the ML-based light encoders may be combined to other latent space representations by summing operations. This may allow the render pipeline to have the flexibility and scalability to handle additional light sources. For example, for a pipeline including a ML-based light encoder that is trained based on the ambient light data, the pipeline may be easily expanded to handle additional point light sources newly added in the environment by using a separate light encoder and combining the latent space representations of the ambient light and the light from the newly added light sources, with no need for re-training the ambient light encoder. On the other hand, for a pipeline including a ML-based light encoder that is trained based on the lighting data of one or more point light sources, the pipeline may be easily expanded to add the ambient light using the separate ambient light encoder and combining the latent space representations of the ambient light and the light from other light sources, with no need for re-training the existing light encoder. In addition, for a pipeline including an ambient ML-based light encoder that is trained based on the ambient light data and a separate light encoder for other light sources, the pipeline may be easily expanded to handle additional light sources newly added in the environment by using an additional light encoder and combining the latent space representations, with no need for re-training the existing light encoders.

Figure 11:
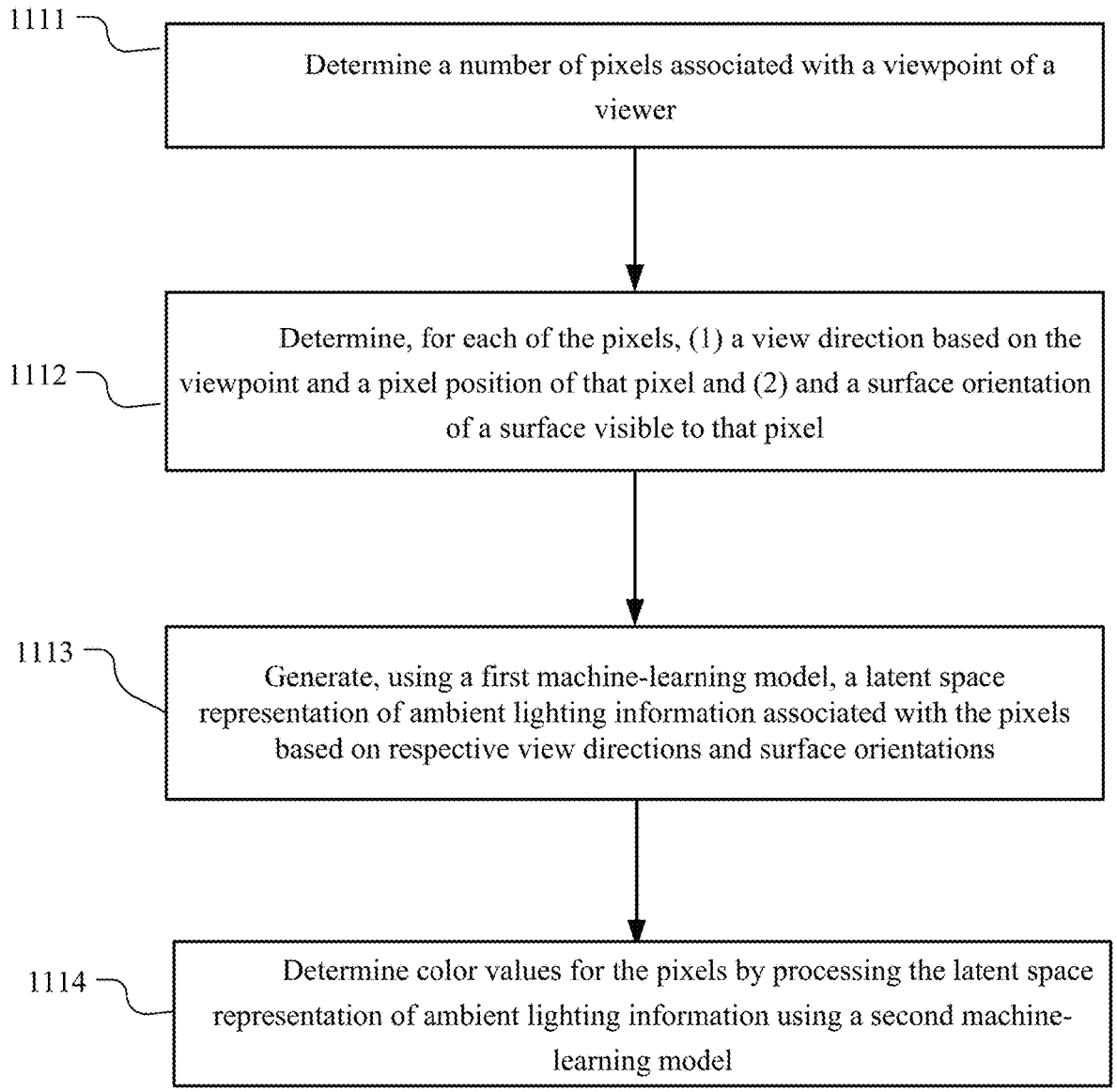
FIG. 11 illustrates an example method for using machine learning models to shade a virtual object illuminated by ambient light of the environment.

FIG. 11 illustrates an example method 1100 for using machine-learning models to shade a virtual object illuminated by ambient light of the environment. The method may begin at step 1111, where a computing system may determine a number of pixels associated with a viewpoint of a viewer. At step 1112, the system may determine, for each pixel of the pixels, (1) a view direction based on the viewpoint and a pixel position of that pixel and (2) a surface orientation of a surface visible to that pixel. At step 1113, the system may generate, using a first machine-learning model, a latent space representation of ambient lighting information associated with the pixels based on respective view directions and surface orientations. At step 1114, the system may determine color values for the pixels by processing the latent space representation of ambient lighting information using a second machine-learning model.

In particular embodiments, the first machine-learning model may be trained based at least on ambient lighting data associated with one or more ambient light sources in an environment. In particular embodiments, the pixels may represent a visual portion of a virtual object to be rendered in the environment. The distances between the one or more ambient light sources and the virtual object in the environment may be greater than a threshold distance. In particular embodiments, the ambient lighting data may be represented by an environmental map comprising one or more panorama images capturing ambient lighting information of the environment from a number of directions. In particular embodiments, the ambient lighting data may be represented by an environmental map including one or more panorama images capturing ambient light information of the environment from at least six directions. The one or more panorama images may correspond to a cube representing a 3D space in the environment.

In particular embodiments, the environment may include one or more additional light sources that are within a threshold distance to the virtual object. In particular embodiments, the system may determine, using a third machine-learning model and for the pixels, an additional latent space representation for additional lighting information associated with the one or more additional light sources. The system may determine a combined latent space representation based on the latent spade representation of the ambient lighting information and the additional latent space representation of the additional lighting information. The color values of the pixels may be determined based on the combined latent space representation. In particular embodiments, determining the color values for the pixels may include processing, using the second machine-learning model, a number of material properties associated with a visible portion of the virtual object. The visible portion of the virtual object may be represented by the plurality of pixels. In particular embodiments, the latent space representation may include a number of latent vectors corresponding to the ambient lighting information associated with the pixels, respectively. The ambient lighting information may include ambient light intensity information of a number of directions in the environment. In particular embodiments, each of the latent vectors in the latent space representation may encode the ambient lighting information from a corresponding direction. In particular embodiments, determining the latent space representation may include determining a sub-level latent space representation for each pixel of the pixels. The latent space representation may be determined based on an aggravation of the sub-level patent space representations.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for using a machine learning models to shade a virtual object illuminated by ambient light of the environment including the particular steps of the method of FIG. 11, this disclosure contemplates any suitable method using a machine learning models to shade a virtual object illuminated by ambient light of the environment including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
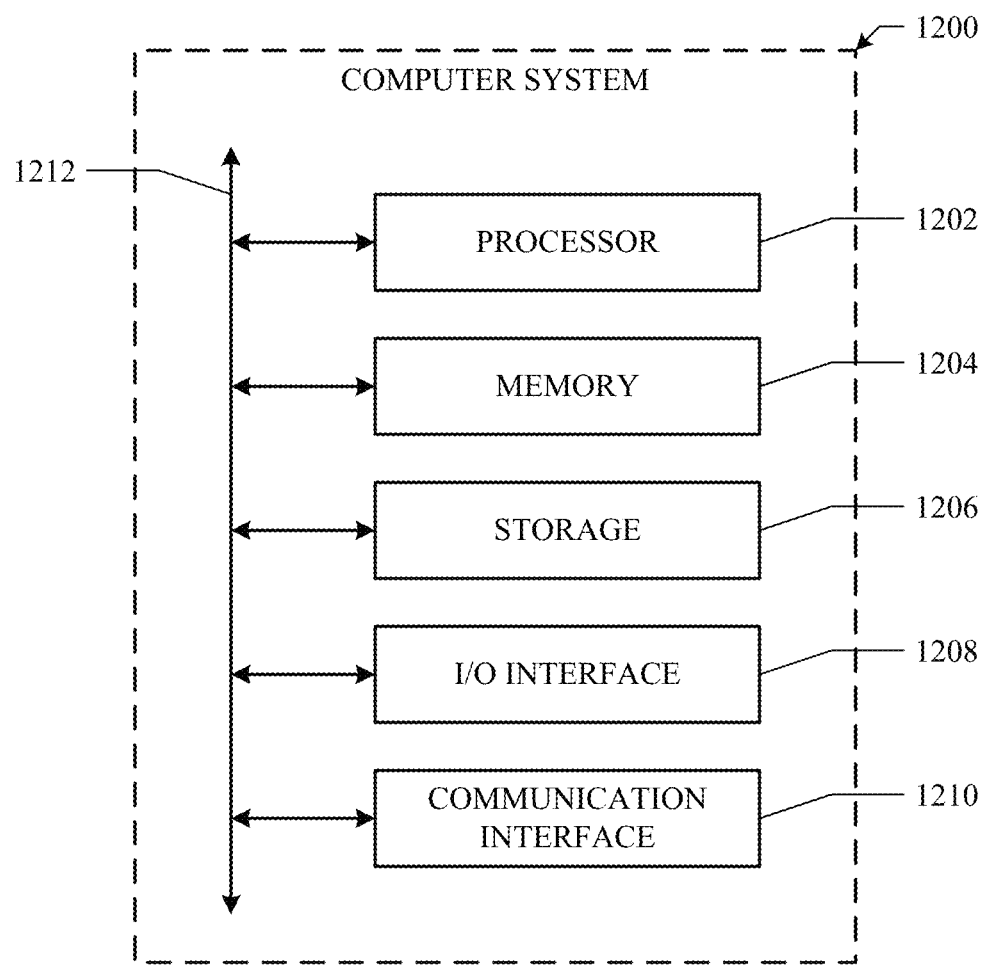
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a plurality of pixels associated with a viewpoint of a viewer;
   determining, for each pixel of the plurality of pixels, (1) a view direction based on the viewpoint and a pixel position of that pixel and (2) a surface orientation of a surface visible to that pixel;
   generating, using a first machine-learning model, a latent space representation of ambient lighting information associated with the plurality of pixels based on respective view directions and surface orientations; and
   determining color values for the plurality of pixels by processing the latent space representation of the ambient lighting information using a second machine-learning model.

2. The method of claim 1, wherein the first machine-learning model is trained based at least on ambient lighting data associated with one or more ambient light sources in an environment.

3. The method of claim 2, wherein the plurality of pixels represents a visible portion of a virtual object to be rendered in the environment, and wherein distances between the one or more ambient light sources and the virtual object in the environment are greater than a threshold distance.

4. The method of claim 2, wherein the ambient lighting data is represented by an environmental map comprising one or more panorama images capturing the ambient lighting information of the environment from a plurality of directions.

5. The method of claim 2, wherein the ambient lighting data is represented by an environmental map comprising one or more panorama images capturing ambient light information of the environment from at least six directions, and wherein the one or more panorama images correspond to a cube representing a 3D space in the environment.

6. The method of claim 2, wherein the environment further comprises one or more additional light sources that are within a threshold distance to a virtual object.

7. The method of claim 6, further comprising:
   determining, using a third machine-learning model and for the plurality of pixels, an additional latent space representation for additional lighting information associated with the one or more additional light sources; and
   determining a combined latent space representation based on the latent space representation of the ambient lighting information and the additional latent space representation of the additional lighting information, wherein the color values of the plurality of pixels are determined based on the combined latent space representation.

8. The method of claim 1, wherein determining the color values for the plurality of pixels comprises:
processing, using the second machine-learning model, a plurality of material properties associated with a visible portion of a virtual object, and wherein the visible portion of the virtual object is to be represented by the plurality of pixels.

9. The method of claim 1, wherein the latent space representation comprises a plurality of latent vectors corresponding to the ambient lighting information associated with the plurality of pixels, respectively, and wherein the ambient lighting information comprises ambient light intensity information of a plurality of directions in the environment.

10. The method of claim 9, wherein each of the plurality of latent vectors in the latent space representation encodes the ambient lighting information from a corresponding direction.

11. The method of claim 1, wherein determining the latent space representation comprises determining a sub-level latent space representation for each pixel of the plurality of pixels, and wherein the latent space representation is determined based on an aggregation of the sub-level patent space representations.

12. One or more computer-readable non-transitory storage media embodying software that is operable when executed to:
determine a plurality of pixels associated with a viewpoint of a viewer;
determine, for each pixel of the plurality of pixels, (1) a view direction based on the viewpoint and a pixel position of that pixel and (2) a surface orientation of a surface visible to that pixel;
generate, using a first machine-learning model, a latent space representation of the ambient lighting information associated with the plurality of pixels based on respective view directions and surface orientations; and
determine color values for the plurality of pixels by processing the latent space representation of the ambient lighting information using a second machine-learning model.

13. The media of claim 12, wherein the first machine-learning model is trained based at least on ambient lighting data associated with one or more ambient light sources in an environment.

14. The media of claim 13, wherein the plurality of pixels represents a visible portion of a virtual object to be rendered in the environment, and wherein distances between the one or more ambient light sources and the virtual object in the environment are greater than a threshold distance.

15. The media of claim 14, wherein the ambient lighting data is represented by an environmental map comprising one or more panorama images capturing the ambient lighting information of the environment from a plurality of directions.

16. The media of claim 14, wherein the ambient lighting data is represented by an environmental map comprising one or more panorama images capturing ambient light information of the environment from at least six directions, and wherein the one or more panorama images correspond to a cube representing a 3D space in the environment.

17. A system comprising:
one or more processors; and
one or more computer-readable non-transitory storage media coupled to one or more of the processors and comprising instructions operable when executed by one or more of the processors to cause the system to:
determine a plurality of pixels associated with a viewpoint of a viewer;
determine, for each pixel of the plurality of pixels, (1) a view direction based on the viewpoint and a pixel position of that pixel and (2) a surface orientation of a surface visible to that pixel;
generate, using a first machine-learning model, a latent space representation of ambient lighting information associated with the plurality of pixels based on respective view directions and surface orientations; and
determine color values for the plurality of pixels by processing the latent space representation of the ambient lighting information using a second machine-learning model.

18. The system of claim 17, wherein the first machine-learning model is trained based at least on ambient lighting data associated with one or more ambient light sources in an environment.

19. The system of claim 18, wherein the plurality of pixels represents a visible portion of a virtual object to be rendered in the environment, and wherein distances between the one or more ambient light sources and the virtual object in the environment are greater than a threshold distance.

20. The system of claim 18, wherein the ambient lighting data is represented by an environmental map comprising one or more panorama images capturing the ambient lighting information of the environment from a plurality of directions.

* * * * *